(12) United States Patent
Higashi et al.

(10) Patent No.: US 8,202,327 B2
(45) Date of Patent: Jun. 19, 2012

(54) PIGMENT COMPOSITION, INKJET RECORDING INK, COLORING COMPOSITION FOR COLOR FILTER, AND COLOR FILTER

(75) Inventors: Masahiro Higashi, Shizuoka (JP); Yoshihiro Jimbo, Shizuoka (JP); Keiichi Tateishi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/171,768

(22) Filed: Jun. 29, 2011

(65) Prior Publication Data

US 2012/0001133 A1 Jan. 5, 2012

(30) Foreign Application Priority Data

Jun. 30, 2010 (JP) .................................. 2010-150590

(51) Int. Cl.
C09B 67/22 (2006.01)
C09D 11/02 (2006.01)

(52) U.S. Cl. ...... 8/637.1; 8/638; 8/639; 8/690; 106/31.8
(58) Field of Classification Search ............ 8/637.1, 8/638, 639, 690; 106/31.8
See application file for complete search history.

(56) References Cited

U.S. PATENT DOCUMENTS

2004/0163569 A1* 8/2004 Shakhnovich ............... 106/31.8

FOREIGN PATENT DOCUMENTS

| JP | 2008-202021 A | 9/2008 |
| JP | 2008-208366 A | 9/2008 |
| JP | 2010-043255 A | 2/2010 |
| JP | 2010-085979 A | 4/2010 |
| WO | 2010/008081 A1 | 1/2010 |
| WO | 2010/026969 A1 | 3/2010 |

OTHER PUBLICATIONS

STIC Search Report dated Aug. 16, 2011.*
Extended European Search Report from the European Patent Office dated Sep. 21, 2011 in the corresponding European Patent Application No. 11172116.3.

* cited by examiner

*Primary Examiner* — Eisa Elhilo
(74) *Attorney, Agent, or Firm* — Sughrue Mion, PLLC

(57) ABSTRACT

A pigment composition including (A) an azo pigment represented by formula (1), and

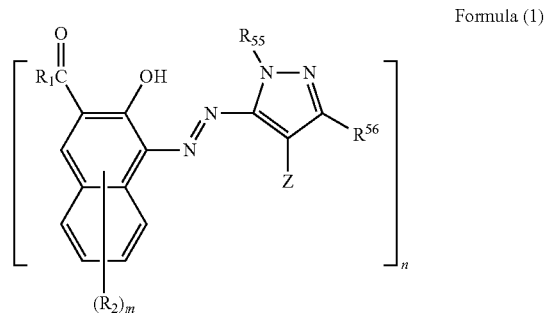

Formula (1)

at least one of (B) a coloring agent represented by formula (2), or (C) at least one additive represented by formula (3) or an additive represented by formula (4).

8 Claims, No Drawings

PIGMENT COMPOSITION, INKJET RECORDING INK, COLORING COMPOSITION FOR COLOR FILTER, AND COLOR FILTER

CROSS-REFERENCE TO RELATED APPLICATION(S)

The present application claims priority from Japanese Patent Application No. 2010-150590 filed on Jun. 30, 2011, the entire content of which is incorporated herein by reference.

BACKGROUND

1. Field

The present invention relates to a pigment composition, an inkjet recording ink, a coloring composition for color filter, and a color filter.

2. Description of the Related Art

In recent years, as image-recording materials, materials for forming color images have been predominant and, specifically, recording materials for an ink jet system, recording materials for a thermal transfer system, recording materials for an electro-photographic system, transfer type silver halide light-sensitive materials, printing inks, and recording pens have found widespread use. Also, in photographing devices such as CCDs for photographing equipment, and in LCDs and PDPs for display, color filters are used for recording or reproducing a color image. In these color image recording materials and color filters, colorants (dyes or pigments) of three primary colors of a so-called additive color mixing process or subtractive color mixing process have been used in order to display or record full-color images. In actuality, however, there is no fast colorant having the absorption characteristics capable of realizing a preferred color reproduction region and resisting various use conditions and environmental conditions. Thus, the improvement thereof has strongly been desired.

Dyes or pigments to be used for the above-mentioned uses are required to have in common the following properties. That is, they are required to have absorption characteristics favorable in view of color reproduction and have good fastness under the conditions of the environment wherein they are used, for example, fastness against light, heat, and an oxidative gas such as ozone. In addition, in the case where the colorant is a pigment, the pigment is further required to be substantially insoluble in water or in an organic solvent, to have a good fastness to chemicals, and not to lose the preferred absorption characteristics it shows in a molecularly dispersed state even when used as particles. Although the required properties described above can be controlled by adjusting the intensity of intermolecular interaction, both of them are in a trade-off relation with each other, thus being difficult to allow them to be compatible with each other. Besides, in the case of using a pigment as the colorant, the pigment is additionally required to have a particle size and a particle shape necessary for realizing desired transparency, to have good fastness under the conditions of the environment wherein they are used, for example, fastness against light, heat, and an oxidative gas such as ozone, to have good fastness to an organic solvent and chemicals such as a sulfurous acid gas, and to be capable of being dispersed in a used medium to a level of fine particles, with the dispersed state being stable. In particular, there is a strong demand for a pigment which has a good yellow hue and is fast to light, moist heat, and active gases in the environment, particularly for a pigment having high tinctorial strength and is fast against light.

For example, JP-A-2008-202021 discloses a pigment composition containing an organic pigment and an azo pigment derivative having a β-naphthol group, which is described as being superior in dispersibility, dispersion stability, transparency, and sharpness.

JP-A-2008-208366 discloses a pigment composition containing an organic pigment and a condensed azo pigment derivative, which is described as being excellent in fluidity and stability (resistance to pigment flocculation).

WO 10/008,081 discloses a pigment composition containing a nitrogen-containing heterocyclic azo pigment, which is described as being superior in color characteristics, durability, liquid ink stability, and dispersion stability.

SUMMARY

A pigment composition for application to image recording materials and color filters is required to have not only good dispersibility, storage stability, transparency, sharpness, fluidity, and resistance to flocculation of particles but also high tinctorial strength, good hue, fastness, e.g., to weather, and viscosity stability with time.

An object of the invention is to provide a pigment composition and an inkjet recording ink that are excellent in color characteristics, such as tinctorial strength and hue, fastness to light and ozone, dispersibility, dispersion stability, and viscosity stability with time.

Another object of the invention is to provide a coloring composition for color filter that exhibits good dispersibility and good storage stability with time and provides a color filter having a good hue, good fastness to light, heat, and ozone, high transparency, excellent spectral characteristics, and a high contrast ratio.

Still another object of the invention is to provide a color filter obtained by using the coloring composition for color filter, the color filter having high transparency, excellent spectral characteristics, and a high contrast ratio.

As a result of extensive investigations, the present inventors have found that the above objects are accomplished by providing a pigment composition including a combination of a specific nitrogen-containing heterocyclic azo pigment having a good hue and high fastness to light, heat, and ozone and a coloring agent or additive that exhibits high dispersing power when combined with the azo pigment, and completed the invention. In particular, the coloring agent also exhibits high tinctorial strength and, when combined with the azo dye, provides a composition and an ink with good tinctorial strength and hue.

The objects of the invention are accomplished by the provision of:

(1) A pigment composition including: (A) an azo pigment represented by formula (1):

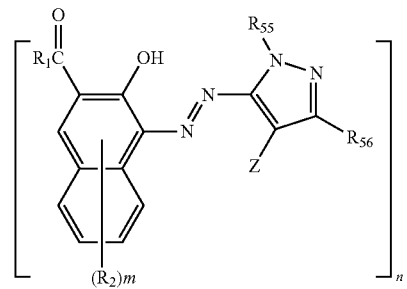

Formula (1)

wherein $R_1$ represents an amino group, an aliphatic oxy group, an aliphatic group, an aryl group, or a heterocyclic group; $R_2$ represents a substituent; $R_{55}$ represents a substituent; $R_{56}$ represents a hydrogen atom or a substituent; Z represents an electron-withdrawing group having a Hammett constant $\sigma_p$ of 0.2 or greater; m represents an integer of 0 to 5; n represents an integer of 1 to 4; when n is 2 to 4, the compound is a dimer, trimer, or tetramer formed via $R_1$, $R_2$, $R_{55}$, $R_{56}$, or Z; and formula (1) has no ionic hydrophilic group, and at least one selected from the group consisting of (B) a coloring agent represented by formula (2), and (C) at least one selected from the group consisting of an additive represented by formula (3) and an additive represented by formula (4):

Formula (2)

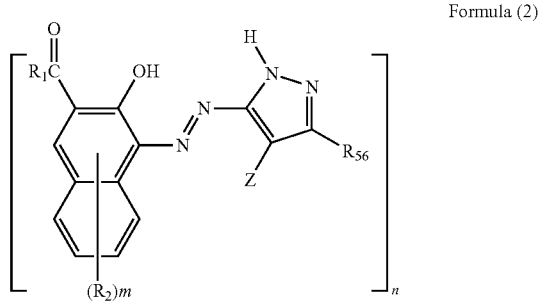

wherein $R_1$, $R_2$, $R_{56}$, Z, m, and n are as defined above:

Formula (3)

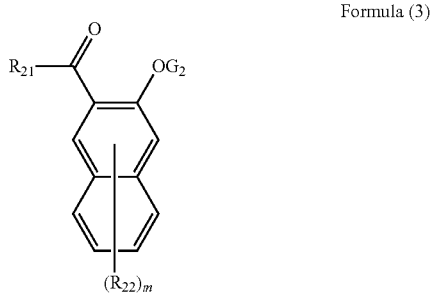

wherein $G_2$ represents a hydrogen atom, an aliphatic group, an aryl group, or a heterocyclic group; $R_{21}$ represents an amino group, an aliphatic oxy group, an aliphatic group, an aryl group, or a heterocyclic group; $R_{22}$ represents a substituent; m is as defined above; and formula (3) has no ionic hydrophilic group:

Formula (4)

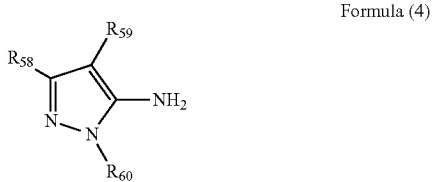

wherein $R_{60}$ represents a hydrogen atom or a substituent; $R_{58}$ and $R_{59}$ each independently represent a hydrogen atom or a substituent; and $R_{58}$ and $R_{59}$ may be taken together to form a 5- or 6-membered ring.

(2) The pigment composition according to (1), including: the azo pigment (A); the coloring agent (B); and the at least one selected from the group consisting of the additive represented by formula (3) and the additive represented by formula (4).

(3) The pigment composition according to (1), wherein the total amount of the at least one of the coloring agent (B) and the at least one of the additive represented by formula (3) and the additive represented by formula (4), relative to the amount of the azo pigment (A), is 0.001% to 10% by mass.

(4) The pigment composition according to (1), wherein the total amount of the at least one of the coloring agent (B) and the at least one of the additive represented by formula (3) and the additive represented by formula (4), relative to the amount of the azo pigment (A), is 0.001% to 5% by mass.

(5) The pigment composition according to (1), wherein the total amount of the at least one of the coloring agent (B) and the at least one of the additive represented by formula (3) and the additive represented by formula (4), relative to the amount of the azo pigment (A), is 0.001% to 3% by mass.

(6) An ink for inkjet recording including the pigment composition according to (1).

(7) A coloring composition for color filter including the pigment composition according to (1).

(8) A color filter including the coloring composition for color filter according to (7).

The invention provides a pigment composition and an inkjet recording ink that are excellent in color characteristics, such as tinctorial strength and hue, fastness, such as light fastness and ozone fastness, dispersibility, dispersion stability, and viscosity stability with time.

The invention also provides a coloring composition for color filters that exhibits good dispersibility and good storage stability with time and provides a color filter having a good hue, good fastness to light, heat, and ozone, high transparency, excellent spectral characteristics, and a high contrast ratio.

The invention also provides a color filter that is obtained by using the coloring composition for color filter, the color filter having high transparency and excellent spectral characteristics and achieving a high contrast ratio.

DETAILED DESCRIPTION OF EXEMPLARY EMBODIMENTS

The terms "aliphatic group", "aryl group", "heterocyclic group", and "substituent" as used herein are defined as follows.

The aliphatic moiety of the aliphatic group may be straight-chain, branched, or cyclic and saturated or unsaturated. Examples of the aliphatic group include alkyl group, alkenyl group, cycloalkyl group, and cycloalkenyl group. The aliphatic group may be substituted or unsubstituted.

The aryl group may be a single ring or a fused ring system, and substituted or unsubstituted. The heterocyclic group has a heterocyclic moiety having a hetero atom (e.g., nitrogen, sulfur, or oxygen) in its ring. The heterocyclic group may be saturated or unsaturated, monocyclic or a fused ring system, and substituted or unsubstituted.

As used herein, the term "substituent" means any group or atom that displaces a hydrogen atom of a compound or a group of atoms. Examples of the substituent include an aliphatic group, an aryl group, a heterocyclic group, an acyl group, an acyloxy group, an acylamino group, an aliphatic oxy group, an aryloxy group, a heterocyclic oxy group, an aliphatic oxycarbonyl group, an aryloxycarbonyl group, a heterocyclic oxy carbonyl group, a carbamoyl group, an aliphatic sulfonyl group, an arylsulfonyl group, a heterocyclic sulfonyl group, an aliphatic sulfonyloxy group, an arylsulfonyloxy group, a heterocyclic sulfonyloxy group, a sulfamoyl group, an aliphatic sulfonamido group, an arylsulfonamido group, a heterocyclic sulfonamido group, an amino group, an aliphatic amino group, an arylamino group, a heterocyclic amino group, an aliphatic oxycarbonylamino group, an aryloxycarbonylamino group, a heterocyclic oxycarbonylamino group, an aliphatic sulfinyl group, an arylsulfinyl group, an aliphatic thio group, an arylthio group, a hydroxyl group, a cyano group, a sulfo group, a carboxyl group, an aliphatic oxyamino group, an aryloxyamino group, a carbamoylamino group, a sulfamoylamino group, a halogen atom, a sulfamoylcarbamoyl group, a carbamoylsulfamoyl group, a di-aliphatic oxyphosphinyl group, and a diaryloxyphosphinyl group.

A Hammett substituent constant σp to be used in this specification is briefly explained below.

The Hammett's rule is an empirical rule advocated by L. P. Hammett in 1935 in an attempt to quantitatively discuss the influences of a substituent on the reaction or equilibrium of a benzene derivative, the validity of which has been widely accepted nowadays. Substituent constants obtained by the Hammett's rule include σp and σm values. These values are found in a number of general books. The details are given in, for example, J. A. Dean (ed.), Lange's Handbook of Chemistry, the 12th Ed., MacGraw-Hill, 1979 and Kagakuno Ryoiki, Extra No. 122, Nankodo, 1979, 96-103. While substituents are described in the invention by reference to their Hammett substituent constants σp, it is needless to say that such description applies to not only the substituents whose Hammett substituent constants σp are known from the literature but those whose Hammett substituent constants σp are unknown from the literature but are to fall within a range in question when determined in accordance with the Hammett's rule. Although compounds of the invention represented by the general formulae (1) are not benzene derivatives, σp values are referred to as a measure of the electron effect of their substituents irrespective of the position of substitution. In the invention, the σp value will be used hereinafter.

As described above, the pigment composition of the invention contains (A) an azo pigment represented by formula (1), and at least one selected from the group consisting of (B) a coloring agent represented by formula (2) and (C) at least one selected from the group consisting of an additive represented by formula (3) and an additive represented by formula (4).

The pigment composition of the invention contains (A) an azo pigment represented by formula (1), (B) a coloring agent represented by formula (2), and (C) at least one selected from the group consisting of an additive represented by formula (3) and an additive represented by formula (4).

By virtue of the presence of the coloring agent (B) and/or the additive (C) at least one selected from the group consisting of an additive represented by formula (3) and an additive represented by formula (4), the pigment composition of the invention exhibits a good hue and excellent dispersibility and can provide an image recording material or a color filter with good sharpness and gloss without causing flooding and floating of pigments due to flocculation. The storage stability with time of the pigment composition is also improved. These effects are produced because the specific coloring agent and/or the specific additive, on being mixed with the azo pigment (A) in the preparation of the pigment composition, are adsorbed onto the active sites of the azo pigment (A) to suppress crystal growth of the pigment. The adsorption phenomenon of the used coloring agent and/or used additive owes to their structural features. As a result, the pigment composition is prevented from sedimentation with time, exhibiting improved storage stability with time.

The components of the pigment composition of the invention will be described in detail.

(1) Azo Pigment (A)

The azo pigment (A) of the invention represented by formula (1) (hereinafter, called "azo pigment (A)" or "azo compound (A)" in some cases) will be described below.

Pigments are in a state wherein molecules constituting them are strongly connected to each other through aggregation energy produced by strong interaction between pigment molecules. In order to realize this state, van der Waals force and intermolecular hydrogen bond are necessary as described in, for example, The Imaging Society of Japan, vol. 43, p. 10 (2004).

In order to increase the intermolecular van der Waals force, introduction of an aromatic group, a polar group and/or a hetero atom to a molecule may be considered. Also, in order to form intermolecular hydrogen bond, introduction of a substituent which contains a hydrogen atom connected to a hetero atom and/or introduction of an electron donative substituent may be considered. Further, polarity of the entire molecule may preferably be considered to be higher. For these purposes, with a chain group such as an alkyl group, a shorter group may be considered to be preferred and, with respect to the value of molecular weight/azo group, a smaller value may be considered to be preferred.

From these standpoints, pigment particles preferably contain an amido bond, a sulfonamido bond, an ether bond, a sulfon group, an oxycarbonyl group, an imido group, a carbamoylamino group, a heterocyclic ring, a benzene ring, or the like.

The azo pigment (A) exhibits excellent color characteristics, such as tinctorial strength and hue, as well as high fastness to light, ozone, and the like, by having the specific structure of formula (1).

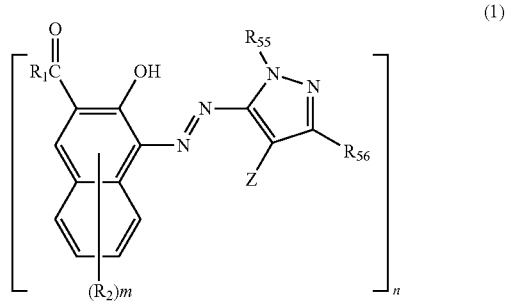

(1)

In formula (1), $R_1$ represents an amino group, an aliphatic oxy group, an aliphatic group, an aryl group, or a heterocyclic group; $R_2$ represents a substituent; $R_{55}$ represents a substituent; $R_{56}$ represents a hydrogen atom or a substituent; Z represents an electron-withdrawing group having a Hammett constant σp of 0.2 or greater; m represents an integer of 0 to 5; n represents an integer of 1 to 4; when n is 2 to 4, the compound is a dimer, trimer, or tetramer formed via $R_1$, $R_2$, $R_{55}$, $R_{56}$, or Z; and formula (1) has no ionic hydrophilic group.

The amino group as represented by $R_1$ optionally has any substituent defined and exemplified above, suitably selected from an alkyl group, an aryl group, and a heterocyclic group. The substituent may further has a substituent which is preferably selected from an aliphatic group, a hydroxyl group, and a substituent having an amido linkage, an ether linkage, an oxycarbonyl linkage, a thioether linkage, or a like linkage, with those having a hetero atom-hydrogen bond being particularly preferred for facilitating intermolecular interaction, such as intermolecular hydrogen bond.

Preferred examples of the optionally substituted amino group as $R_1$ include an unsubstituted amino group, an alkylamino group containing a total of 1 to 10 carbon atoms, a dialkylamino group containing a total of 2 to 10 carbon atoms, an arylamino group containing a total of 6 to 13 carbon atoms, and a saturated or unsaturated heterocyclic amino group containing a total of 2 to 12 carbon atoms. More preferred are an unsubstituted amino group, an alkylamino group containing a total of 1 to 8 carbon atoms, an arylamino group containing a total of 6 to 13 carbon atoms, and a saturated or unsaturated heterocyclic amino group containing a total of 2 to 12 carbon atoms, such as methylamino, N,N-dimethylamino, N-phenylamino, and N-(2-pyrimidyl)amino. Even more preferred are optionally substituted arylamino having a total of 6 to 13 carbon atoms and optionally substituted, saturated or unsaturated heterocyclic amino having a total of 2 to 12 carbon atoms.

The arylamino group as $R_1$ may have a substituent on the aryl moiety thereof, preferably at the para-position with respect to the nitrogen of the amino moiety, more preferably only one substituent at the para-position with respect to the nitrogen of the amino moiety. The substituent may be any substituent defined and exemplified above. Preferred examples of the substituent include an optionally substituted aliphatic group having a total of 1 to 7 (more preferably 1 to 4) carbon atoms (e.g., methyl, ethyl, allyl, isopropyl, or t-butyl), an optionally substituted aliphatic oxy group having a total of 1 to 7 (more preferably 1 to 4) carbon atoms (e.g., methoxy, ethoxy, isopropyloxy, or allyloxy), a halogen atom (e.g., fluoro, chloro, or bromo), an optionally substituted carbamoyl group having a total of 1 to 7 (more preferably 1 to 4) carbon atoms (e.g., carbamoyl, N-phenylcarbamoyl, or N-methylcarbamoyl), an optionally substituted ureido group having a total of 1 to 7 (more preferably 1 to 4) carbon atoms (e.g., ureido, N-methylureido, N,N-dimethylureido, N-4-pyridylureido, or N-phenylureido), a nitro group, a heterocyclic ring fused to the aryl moiety having a total of 1 to 7 carbon atoms (e.g., imidazolone), a hydroxyl group, an optionally substituted aliphatic thio group having a total of 1 to 7 (more preferably 1 to 4) carbon atoms (e.g., methylthio, ethylthio, isopropylthio, allylthio, or t-butylthio), optionally substituted acylamino group having a total of 2 to 7 (more preferably 2 to 4) carbon atoms (e.g., acetamino, propionylamino, pivaloylamino, or benzoylamino), optionally substituted aliphatic oxycarbonylamino group having a total of 1 to 7 (more preferably 1 to 4) carbon atoms (e.g., methoxycarbonylamino or propyloxycarbonylamino), optionally substituted aliphatic oxycarbonyl group having a total of 2 to 7 (more preferably 2 to 4) carbon atoms (e.g., methoxycarbonyl or ethoxycarbonyl), and optionally substituted acyl group having a total of 2 to 7 (more preferably 2 to 4) carbon atoms, including aliphatic carbonyl, arylcarbonyl, and heterocyclic carbonyl, each optionally having any substituent identified and exemplified above, preferably an acyl group having a total of 2 to 7 carbon atoms, more preferably an acyl group having a total of 2 to 4, such as acetyl, pivaloyl, benzoyl, or 3-pyridinecarbonyl.

When the substituent is at the para-position on the aryl moiety with respect to the nitrogen atom of the amino moiety, it is located at the molecular terminal, which facilitates forming intermolecular interaction, such as intermolecular hydrogen bond. As a result, the azo pigment (A) exhibits a sharp hue. When the substituent on the aryl moiety further has a substituent, the latter substituent is preferably an aliphatic group, a hydroxyl group, or a substituent having an amido linkage, an ether linkage, an oxycarbonyl linkage, a thioether linkage, or a like linkage. A substituent having a hetero atom-hydrogen bond is more preferred for facilitating forming intermolecular interaction, such as intermolecular hydrogen bond.

The heterocyclic amino group as $R_1$ may have on the heterocyclic ring thereof any of the substituents defined above. Preferred examples of the substituent are the same as those listed as for the arylamino group. When the substituent on the heterocyclic ring further has a substituent, the latter substituent is preferably an aliphatic group, a hydroxyl group, or a substituent having an amido linkage, an ether linkage, an oxycarbonyl linkage, a thioether linkage, or a like linkage. A substituent having a hetero atom-hydrogen bond is more preferred for facilitating forming intermolecular interaction, such as intermolecular hydrogen bond.

More preferred substituents of the arylamino and heterocyclic amino as $R_1$ are an aliphatic group, an aliphatic oxy group, halogen, carbamoyl, nitro, a heterocyclic ring fused to the aryl moiety or the heterocyclic ring moiety, and aliphatic oxycarbonyl, with an aliphatic group having a total of 1 to 4 carbon atoms, an aliphatic oxy group having a total of 1 to 4 carbon atoms, a halogen atom, a carbamoyl group having a total of 1 to 4 carbon atoms, a nitro group, and an aliphatic oxycarbonyl group having a total of 2 to 4 carbon atoms being even more preferred.

The aliphatic oxy group represented by $R_1$ may have a substituent and may be saturated or unsaturated. As the substituent, any group that has been described hereinbefore in the aforesaid paragraph on substituents and that is substitutable may be employed. Preferred examples of the substituent includes a hydroxyl group, an aliphatic oxy group, a carbamoyl group, an aliphatic oxy carbonyl group, an aliphatic thio group, an amino group, an aliphatic amino group, an acylamino group, and a carbamoylamino group. As the aliphatic oxy group of $R_1$, an alkoxy group containing a total of 1 to 8 carbon atoms is preferred, and an alkoxy group containing a total of 1 to 4 carbon atoms is more preferred. Examples thereof include methoxy, ethoxy, (t)-butoxy, methoxyethoxy, and carbamoylmethoxy.

The aliphatic group as $R_1$ may have a substituent and may be saturated or unsaturated. As the substituent, any group that has been described hereinbefore in the aforesaid paragraph on substituents and that is substitutable may be employed. Preferred examples of the substituent include a hydroxyl group an aliphatic oxy group, a carbamoyl group, an aliphatic oxycarbonyl group, an aliphatic thio group, an amino group, an aliphatic amino group, an acylamino group, and a carbamoylamino group. The aliphatic group as $R_1$ is preferably alkyl with a total of 1 to 8 carbon atoms, more preferably alkyl with a total of 1 to 4 carbon atoms, such as methyl, ethyl, sec-butyl, methoxyethyl, or carbamoylmethyl.

The aryl group represented by $R_1$ may have a substituent. As the substituent, any group that has been described hereinbefore in the aforesaid paragraph on substituents and that is substitutable may be employed. Preferred examples of the substituent include an aliphatic group, an aliphatic oxy group, a halogen atom, a carbamoyl group, a heterocyclic ring fused to the aryl group, and an aliphatic oxycarmonyl group. The aryl group of $R_1$ is preferably an aryl group containing a total of 6 to 12 carbon atoms, more preferably an aryl group containing a total of 6 to 10 carbon atoms. Examples thereof include phenyl, 4-methylphenyl, and 3-chlorophenyl.

The heterocyclic group represented by $R_1$ may be a saturated heterocyclic group or an unsaturated heterocyclic group, and may have a substituent. As the substituent, any group that has been described hereinbefore in the aforesaid paragraph on substituents and that is substitutable may be employed. Preferred examples of the subsituent include an aliphatic group, an aliphatic oxy group, a carboamoyl group, a heterocyclic ring fused to the heterocyclic group, and an aliphatic oxycarbonyl group. The heterocyclic group represented by $R_1$ is preferably a heterocyclic group containing a total of 2 to 10 carbon atoms, more preferably a saturated heterocyclic group containing a total of 2 to 8 carbon atoms and being connected through a nitrogen atom. Examples thereof include 1-piperidyl, 4-morpholinyl, 2-pyrimidyl, and 4-pyridyl.

$R_1$ is preferably optionally substituted amino group, aliphatic oxy group, hydroxyl group, or a nitrogen-containing, saturated heterocyclic group bonded at the nitrogen atom, more preferably optionally substituted amino group, aliphatic oxy group, or hydroxyl group, even more preferably optionally substituted amino group, most preferably an alkylamino group or an arylamino group. The alkylamino group or arylamino group may further have a substituent, preferably an alkoxy group.

The substituent represented by $R_2$ may be any group that has been described hereinbefore in the aforesaid paragraph on substituents and that is substitutable may be employed, and is preferably an aliphatic group, an aryl group, a heterocyclic group, an aliphatic oxycarbonyl group, a carboxyl group, a carbamoyl group which may have a substituent, an acylamino group, a sulfonamido group, a carbamoylamino group which may have a substituent, a sulfamoyl group which may have a substituent, an aliphatic oxy group, an aliphatic thio group, a cyano group, or a halogen atom, more preferably an aliphatic oxycarbonyl group, a carbamoyl group which may have a substituent, an acylamino group, a carbamoyl amino group which may have a substituent, an aliphatic oxy group, or a halogen atom, most preferably an aliphatic oxy group.

When the substituent as $R_2$ is further substituted by a substituent, the latter substituent is preferably selected from an aliphatic group, a hydroxyl group, and a substituent having an amino linkage, an ether linkage, an oxycarbonyl linkage, a thioether linkage, or a like linkage, with a substituent having a hetero atom-hydrogen bond being particularly preferred for facilitating forming intermolecular interaction, such as intermolecular hydrogen bond.

The aliphatic group represented by $R_2$ may have a substituent, and may be saturated or unsaturated and, as a group which may be the substituent, any group that has been described hereinbefore in the aforesaid paragraph on substituents and that is substitutable may be employed. The aliphatic group of $R_2$ is preferably an alkyl group containing a total of 1 to 8 carbon atoms, more preferably an alkyl group containing a total of 1 to 6 carbon atoms, and examples thereof include methyl, ethyl, i-propyl, cyclohexyl, and t-butyl.

The aryl group represented by $R_2$ may have a substituent and, as a group which may be the substituent, any group that has been described hereinbefore in the aforesaid paragraph on substituents and that is substitutable may be employed. The aryl group of $R_2$ is preferably an aryl group containing a total of 6 to 12 carbon atoms, more preferably an aryl group containing a total of 6 to 10 carbon atoms, and examples thereof include phenyl, 3-methoxyphenyl, and 4-carbamoylphenyl.

The heterocyclic group represented by $R_2$ may have a substituent and may be saturated or unsaturated or condensed with other ring. As a group which may be the substituent, any group that has been described hereinbefore in the aforesaid paragraph on substituents and that is substitutable may be employed. The heterocyclic group of $R_2$ is preferably a heterocyclic group containing a total of 2 to 16 carbon atoms, more preferably a 5- or 6-membered heterocyclic ring containing a total of 2 to 12 carbon atoms. Examples thereof include 1-pyrrolidinyl, 4-morpholinyl, 2-pyridyl, 1-pyrrolyl, 1-imidazolyl, and 1-benzimidazolyl.

The aliphatic oxycarbonyl group represented by $R_2$ may have a substituent and may be saturated or unsaturated. As a group which may be the substituent, any group that has been described hereinbefore in the aforesaid paragraph on substituents and that is substitutable may be employed. The aliphatic oxycarbonyl group of $R_2$ is preferably an alkoxycarbonyl group containing a total of 1 to 8 carbon atoms, more preferably an alkoxycarbonyl group containing a total of 1 to 6 carbon atoms. Examples thereof include methoxycarbonyl, i-propyloxycarbonyl, and carbamoylmethoxycarbonyl.

The carbamoyl group represented by $R_2$ may have a substituent and, as a group which may be the substituent, any group that has been described hereinbefore in the aforesaid paragraph on substituents and that is substitutable may be employed. The substituent is preferably an aliphatic group, an aryl group, a heterocyclic group, or the like. The carbamoyl group of $R_2$ which may have a substituent is preferably a carbamoyl group, an alkylcarbamoyl group containing a total of 2 to 9 carbon atoms, a dialkylcarbamoyl group containing a total of 3 to 10 carbon atoms, an arylcarbamoyl group containing a total of 7 to 13 carbon atoms, or a heterocyclic carbamoyl group containing a total of 3 to 12 carbon atoms, more preferably a carbamoyl group, an alkylcarbamoyl group containing a total of 2 to 7 carbon atoms, a dialkylcarbamoyl group containing a total of 3 to 6 carbon atoms, an arylcarbamoyl group containing a total of 7 to 11 carbon atoms, or a heterocyclic carbamoyl group containing a total of 3 to 10 carbon atoms. Examples thereof include carbamoyl, methylcarbamoyl, dimethylcarbamoyl, phenylcarbamoyl, and 4-pyridinecarbamoyl.

The acylamino group represented by $R_2$ may have a substituent and may be aliphatic, aromatic, or heterocyclic and, as a group which may be the substituent, any group that has been described hereinbefore in the aforesaid paragraph on substituents and that is substitutable may be employed. The acylamino group of $R_2$ is preferably an acylamino group containing a total of 2 to 12 carbon atoms, more preferably an acylamino group containing a total of 1 to 8 carbon atoms, still more preferably an alkylcarbonylamino group containing a total of 1 to 8 carbon atoms. Examples thereof include acetylamino, benzoylamino, 2-pyridinecarbonylamino, and propanoylamino.

The sulfonamido group represented by $R_2$ may have a substituent and may be aliphatic, aromatic, or heterocyclic and, as a group which may be the substituent, any group that has been described hereinbefore in the aforesaid paragraph on substituents and that is substitutable may be employed. The sulfonamido group of $R_2$ is preferably a sulfonamido group containing a total of 1 to 12 carbon atoms, more preferably a sulfonamido group containing a total of 1 to 8 carbon atoms, still more preferably a sulfonamido group containing a total of 1 to 8 carbon atoms. Examples thereof include methanesulfonamido, benzenesulfonamido, and 2-pyridinesulfonamido.

The carbamoylamino group represented by $R_2$ may have a substituent and, as a group which may be the substituent, any group that has been described hereinbefore in the aforesaid paragraph on substituents and that is substitutable may be employed. The substituent is preferably an aliphatic group, an aryl group, a heterocyclic group, or the like. The carbamoylamino group of $R_2$ which may have a substituent is preferably a carbamoylamino group, an alkylcarbamoylamino group containing a total of 2 to 9 carbon atoms, a dialkylcarbamoylamino group containing a total of 3 to 10 carbon atoms, an arylcarbamoylamino group containing a total of 7 to 13 carbon atoms, or a heterocyclic carbamoylamino group containing a total of 3 to 12 carbon atoms, more preferably a carbamoylamino group, an alkylcarbamoylamino group containing a total of 2 to 7 carbon atoms, a dialkylcarbamoylamino group containing a total of 3 to 6 carbon atoms, an arylcarbamoylamino group containing a total of 7 to 11 carbon atoms, or a heterocyclic carbamoylamino group containing a total of 3 to 10 carbon atoms. Examples thereof include carbamoylamino, methylcarbamoylamino, N,N-dimethylcarbamoylamino, phenylcarbamoylamino, and 4-pyridinecarbamoylamino.

With the sulfamoyl group which is represented by $R_2$ and which may have a substituent, the group which may be a substituent may be any group that has been described hereinbefore in the aforesaid paragraph on substituents that is substitutable. The substituent is preferably an aliphatic group, an aryl group, a heterocyclic group, or the like. The sulfamoyl group of $R_2$ which may have a substituent is preferably a sulfamoyl group, an alkylsulfamoyl group containing a total of 1 to 9 carbon atoms, a dialkylsulfamoyl group containing a total of 2 to 10 carbon atoms, an arylsulfamoyl group containing a total of 7 to 13 carbon atoms, or a heterocyclic sulfamoyl group containing a total of 2 to 12 carbon atoms, more preferably a sulfamoyl group, an alkylsulfamoyl group containing a total of 1 to 7 carbon atoms, a dialkylsulfamoyl group containing a total of 3 to 6 carbon atoms, an arylsulfamoyl group containing a total of 6 to 11 carbon atoms, or a heterocyclic sulfamoyl group containing a total of 2 to 10 carbon atoms. Examples thereof include sulfamoyl, methylsulfamoyl, N,N-dimethylsulfamoyl, phenylsulfamoyl, and 4-pyridinesulfamoyl.

The aliphatic oxy group represented by $R_2$ may have a substituent and may be saturated or unsaturated and, as a group which may be the substituent, any group that has been described hereinbefore in the aforesaid paragraph on substituents and that is substitutable may be employed. The aliphatic oxy group of $R_2$ is preferably an alkoxy group containing a total of 1 to 8 carbon atoms, more preferably an alkoxy group containing a total of 1 to 6 carbon atoms, and examples thereof include methoxy, ethoxy, i-propyloxy, cyclohexyloxy, and methoxyethoxy.

The aliphatic thio group represented by $R_2$ may have a substituent and may be saturated or unsaturated and, as a group which may be the substituent, any group that has been described hereinbefore in the aforesaid paragraph on substituents and that is substitutable may be employed. The aliphatic thio group of $R_2$ is preferably an alkyl thio group containing a total of 1 to 8 carbon atoms, more preferably an alkyl thio group containing a total of 1 to 6 carbon atoms, and examples thereof include methylthio, ethylthio, carbamoylmethylthio, and t-butylthio.

The halogen atom represented by $R_2$ is preferably a fluorine, a chlorine, or a bromine, with a chlorine being more preferred.

$R_2$ is preferably an aliphatic oxy group, an aliphatic oxycarbonyl group, or optionally substituted carbamoyl group, more preferably an aliphatic oxy group, in terms of the effect of the invention. Particularly preferred is an alkoxy group having a total of 1 to 8 carbon atoms, more preferably an alkoxy group having a total of 1 to 4 carbon atoms, even more preferably methoxy or ethoxy, and most preferably methoxy.

m is preferably 0 to 3, more preferably 0 or 1, even more preferably 0. n is preferably 1 or 2, more preferably 1.

The substituent represented by $R_{55}$ may be any group that has been described hereinbefore in the aforesaid paragraph on substituents and that is substitutable may be employed. The substituent of $R_{55}$ is preferably an aliphatic group, an aryl group, a heterocyclic group, or the like, more preferably an aliphatic group, an aryl group, or an aromatic 5- or 6-membered heterocyclic group containing a nitrogen atom at a position adjacent to the binding position.

In view of the effects of the invention, $R_{55}$ is preferably an aliphatic group, an aryl group, or a heterocyclic group, more preferably an aliphatic group, an aryl group, or an aromatic 5- or 6-membered heterocyclic group containing a nitrogen atom at a position adjacent to the binding position, still more preferably an aromatic 5- or 6-membered heterocyclic group containing a nitrogen atom at a position adjacent to the binding position. When $R_{55}$ is an aromatic 5- or 6-membered heterocyclic group containing a nitrogen atom at a position adjacent to the binding position, not only the intermolecular mutual action of the colorant molecules but the intramolecular mutual action is easily strengthened. This is favorable in the point that it facilitates formation of a pigment having a stable molecular arrangement, which serves to show good hue and high fastness (e.g., light fastness, gas fastness, heat fastness, water fastness, etc.).

The aromatic 5- or 6-membered heterocyclic group containing a nitrogen atom at a position adjacent to the binding position to the nitrogen atom (to which $R_{55}$ is bonded), which is a preferred substituent as $R_{55}$ in terms of the effect of the invention, may be substituted by any of the substituents defined above. Examples of preferred substituents include a hydroxyl group, an aliphatic oxy group, a carbamoyl group, an aliphatic oxycarbonyl group, an aliphatic thio group, an amino group, an aliphatic amino group, an acylamino group, and a carbamoylamino group. The heterocyclic group may be saturated or unsaturated and may be a fused ring system. The heterocyclic group preferably has a total of 2 to 12 carbon atoms, more preferably 2 to 10 carbon atoms. Examples of the heterocyclic group include 2-thiazolyl, 2-benzothiazolyl, 2-oxazolyl, 2-benzoxazolyl, 2-pyridyl, 2-pyrazinyl, 3-pyridazinyl, 2-pyrimidinyl, 4-pyrimidinyl, 2-imidazolyl, 2-benzimidazolyl, and 2-triazinyl. The heterocyclic group may take a tautomeric structure together with its substituent.

The aryl group, which is a preferred substituent as $R_{55}$ in terms of the effect of the invention, may be substituted by any of the substituents defined above. Examples of preferred substituents include a hydroxyl group, a nitro group, an aliphatic oxy group, a carbamoyl group, an aliphatic oxycarbonyl group, an aliphatic thio group, an amino group, an aliphatic amino group, an acylamino group, and a carbamoylamino group. The aryl group as $R_{55}$ preferably has a total of 6 to 12 carbon atoms, more preferably 6 to 10 carbon atoms. Examples of the aryl group are phenyl, 3-methoxyphenyl, and 4-carbamoylphenyl, with phenyl being preferred.

The aliphatic group, which is a preferred substituent as $R_{55}$ in terms of the effect of the invention, may be saturated or unsaturated and may be substituted by any of the substituents defined above. Examples of preferred substituents include a hydroxyl group, an aliphatic oxy group, a carbamoyl group, an aliphatic oxycarbonyl group, an aliphatic thio group, an amino group, an aliphatic amino group, an acylamino group, and a carbamoylamino group. The aliphatic group as $R_{55}$ preferably has a total of 1 to 8 carbon atoms, more preferably 1 to 4 carbon atoms. Examples of the aliphatic group are methyl, ethyl, vinyl, cyclohexyl, and carbamoylmethyl.

It is particularly preferred that $R_{55}$ be any one of the heterocyclic groups (Y-1) through (Y-13) shown below. To help formation of an intramolecular hydrogen bond, preferred of these heterocyclic groups are 6-membered groups (Y-1) through (Y-6), with (Y-1), (Y-3), (Y-4), and (Y-6) being more preferred, with (Y-1) and (Y-4) being even more preferred, and with (Y-4) being the most preferred. In formulae (Y-1) to (Y-13), the asterisk (*) indicates a position to bond to the nitrogen atom of the pyrazole ring; and $Y_1, Y_2, Y_3, Y_4, Y_5, Y_6, Y_7, Y_8, Y_9, Y_{10}$, and $Y_{11}$ each independently represent hydrogen or a substituent. In formula (Y-13), $G_{11}$ represents a group of non-metal atoms forming an optionally substituted 5- or 6-membered heterocyclic ring that is connected to or fused to the thiazole ring. The heterocyclic groups (Y-1) to (Y-13) may assume a tautomeric structure together with their substituents.

The heterocyclic group as $G_{11}$ has a total of, for example, 2 to 15 carbon atoms, preferably 2 to 10 carbon atoms, and is exemplified by a pyridine ring, a pyrazine ring, a pyrimidine ring, a pyridazine ring, a triazine ring, a pyrrole ring, a furan ring, a thiophene ring, an imidazole ring, a pyrazole ring, an oxazole ring, a thiazole ring, an isoxazole ring, an isothiazole ring, a triazole ring, a thiadiazole ring, and an oxadiazole ring, with a pyridine ring, a pyrrole ring, and a thiophene ring being preferred.

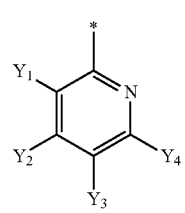

(Y-1)

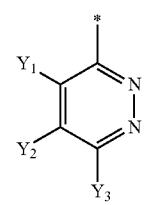

(Y-2)

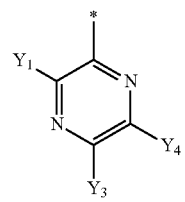

(Y-3)

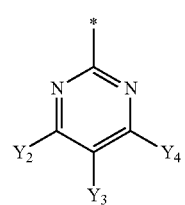

(Y-4)

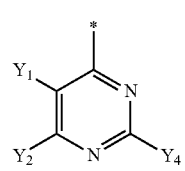

(Y-5)

-continued

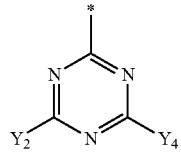

(Y-6)

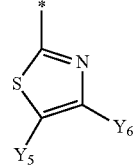

(Y-7)

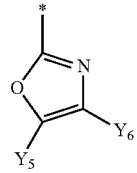

(Y-8)

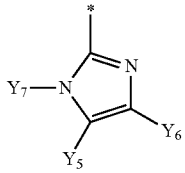

(Y-9)

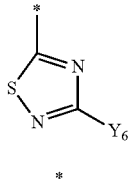

(Y-10)

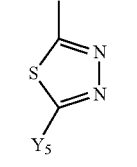

(Y-11)

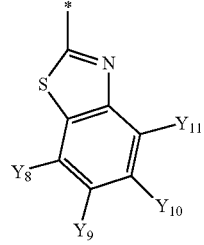

(Y-12)

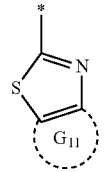

(Y-13)

In view of the effects of the invention, each of $Y_1$ through $Y_{11}$ is preferably a hydrogen atom, an aliphatic group, an aryl group, a heterocyclic group, an aliphatic oxycarbonyl group, optionally substituted carbamoyl group, an acylamino group, a sulfonamide group, an aliphatic oxy group, an aliphatic thio group, and a cyano group, more preferably a hydrogen atom, an aliphatic group, an aliphatic oxycarbonyl group, optionally substituted carbamoyl group, an aliphatic oxy group, an a cyano group.

The substituent represented by $R_{56}$ may be the substituent, any group that has been described hereinbefore in the aforesaid paragraph on substituents and that is substitutable may be employed. Preferred examples of $R_{56}$ include an aliphatic group, an aryl group, a heterocyclic group, an aliphatic oxycarbonyl group, optionally substituted carbamoyl group, an acylamino group, a sulfonamide group, an aliphatic oxy group, an aliphatic thio group, and a cyano group. More preferred of them are an aliphatic group, an aliphatic oxy group, an aliphatic thio group, and a cyano group.

In terms of the effects of the invention, $R_{56}$ is preferably a hydrogen atom, an aliphatic group, an aryl group, a heterocyclic group, an aliphatic oxycarbonyl group, optionally substituted carbamoyl group, an acylamino group, a sulfonamide group, an aliphatic oxy group, an aliphatic thio group, or a cyano group, more preferably a hydrogen atom, an aliphatic group, an aliphatic oxy group, an aliphatic thio group, or a cyano group.

Examples of the electron withdrawing group with a σp value of 0.2 or greater as represented by Z include an acyl group, an acyloxy group, a carbamoyl group, an alkyloxycarbonyl group, an aryloxycarbonyl group, a cyano group, a nitro group, a dialkylphosphono group, a diarylphosphono group, a diarylphosphinyl group, an alkylsulfinyl group, an arylsulfinyl group, an alkylsulfonyl group, an arylsulfonyl group, a sulfonyloxy group, an acylthio group, a sulfamoyl group, a thiocyanate group, a thiocarbonyl group, a haloalkyl group, a haloalkoxy group, a haloaryloxy group, a haloalkylamino group, a haloalkylthio group, an aryl group substituted with another electron withdrawing group having a σp value of 0.2 or greater, a heterocyclic group, a halogen atom, an azo group, and a selenocyanato group.

In terms of the effects of the invention, Z is preferably an acyl group, a carbamoyl group, an alkyloxycarbonyl group, a cyano group, an alkylsulfonyl group, or a sulfamoyl group, more preferably a carbamoyl group, an alkyloxycarbonyl group, or a cyano group, and even more preferably a cyano group.

Of the azo compounds (A) of formula (1), preferred in view of the effects of the invention are those in which $R_1$ is optionally substituted amino or a saturated nitrogen-containing heterocyclic group bonded at the nitrogen atom thereof; m is 0 or 1; $R_2$ (when m=1) is aliphatic oxycarbonyl or optionally substituted carbamoyl; $R_{55}$ is an aromatic 5- or 6-membered heterocyclic group having nitrogen at the ortho position with respect to the nitrogen atom (to which $R_{55}$ is bonded); $R_{56}$ is a hydrogen atom or an aliphatic group; Z is an acyl group, a carbamoyl group, an alkyloxycarbonyl group, a cyano group, an alkylsulfonyl group, or a sulfamoyl group; and n is 1 or 2. More preferred are those in which $R_1$ is optionally substituted amino or a saturated nitrogen-containing heterocyclic group bonded at the nitrogen atom thereof; m is 0; $R_{55}$ is a heterocyclic group selected from (Y-1) through (Y-13); $R_{56}$ is hydrogen or an aliphatic group; Z is a carbamoyl group, an alkyloxycarbonyl group, or a cyano group; and n is 1 or 2. Even more preferred are those in which $R_1$ is optionally substituted amino group; m is 0; $R_{55}$ is a heterocyclic group selected from the group consisting of (Y-1) to (Y-6); $R_{56}$ is a hydrogen atom or an aliphatic group; Z is a carbamoyl group, an alkyloxycarbonyl group, or a cyano group; and n is 1 or 2. Still even more preferred are those in which $R_1$ is optionally substituted amino group; m is 0; $R_{55}$ is (Y-1), (Y-4), or (Y-6); $R_{56}$ is a hydrogen atom; Z is a cyano group; and n is 1 or 2.

In view of the effects of the invention, it is preferred for the azo pigment (A) to have a ratio of the total number of carbon atoms to the number of azo groups of 40 or less, more preferably 30 or less. From the same viewpoint, it is preferred for the azo pigment (A) to have a ratio of the molecular weight to the number of azo groups of 700 or less. In view of the effects of the invention, the azo pigment (A) is free from an ionic hydrophilic group, such as a sulfo group or a carboxyl group.

The azo pigment (A) that has been described as being represented by formula (1) embraces all tautomers of formula (1). Formula (1) represents just one of limiting structure, so that the azo pigment (A) for use in the invention may be any one of such tautomers or may be a mixture of a plurality of such tautomers.

Specific examples of the azo pigments (A) represented by the foregoing general formula (1) will be shown below. However, the azo pigments and the azo compounds to be used in the invention are not limited only to the following examples. Also, it is needless to say that, although the structures of the following specific examples are shown in the form of limiting structure among several tautomer forms which are possible in view of chemical structure, the azo pigments and the azo compounds may be tautomers of other structure than the shown ones.

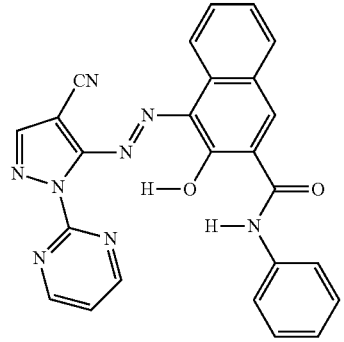

A1

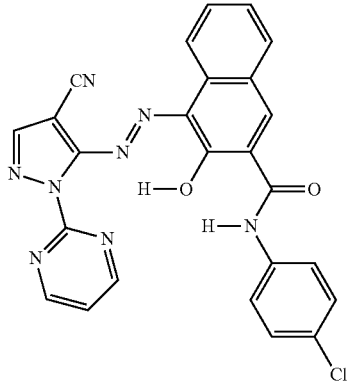

A2

A3
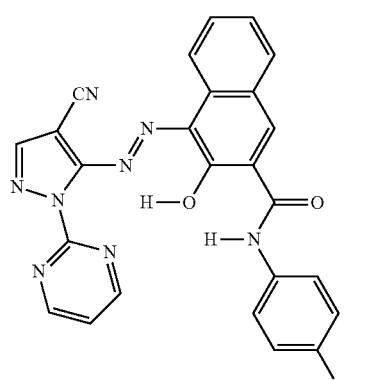
A4
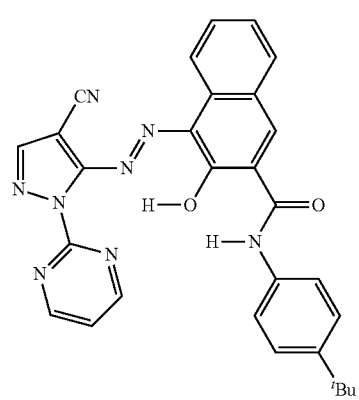
A5
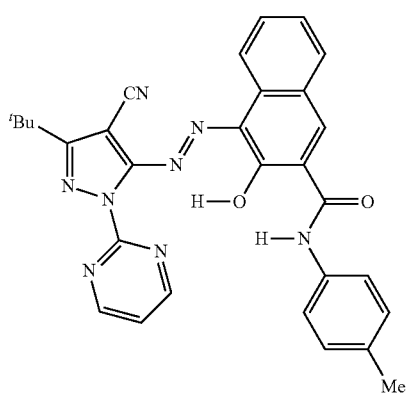
A6
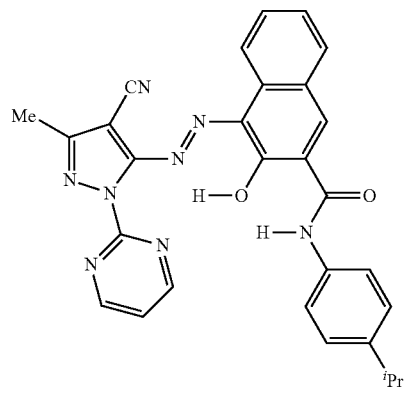
A7
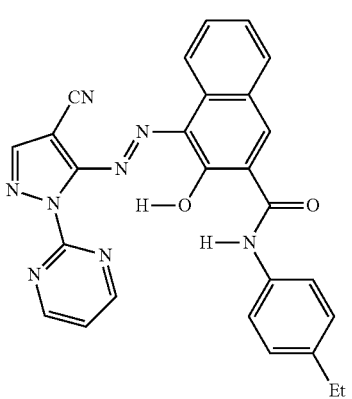
A8
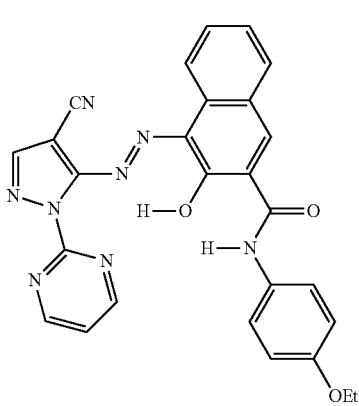
A9
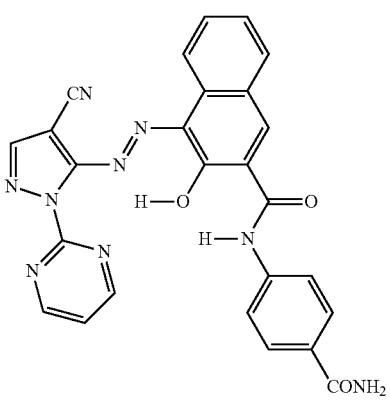
A10
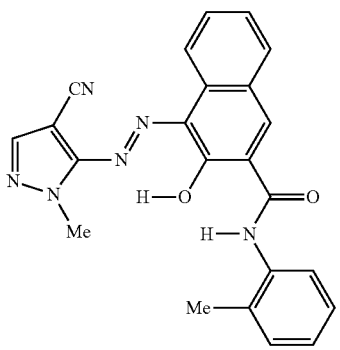

A11
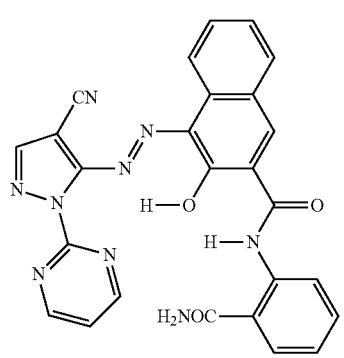
A12
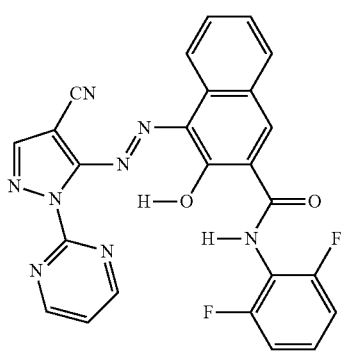
A13
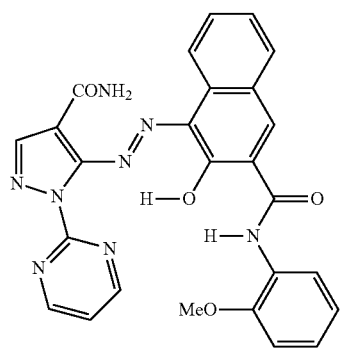
A14
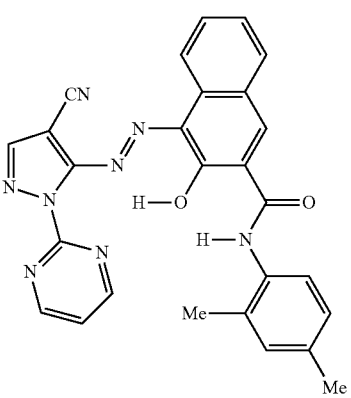
A15
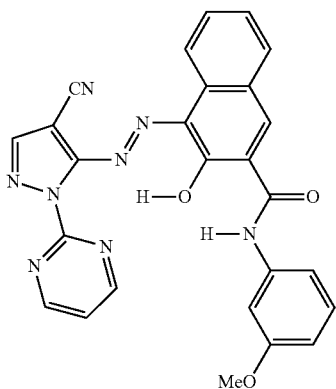
A16
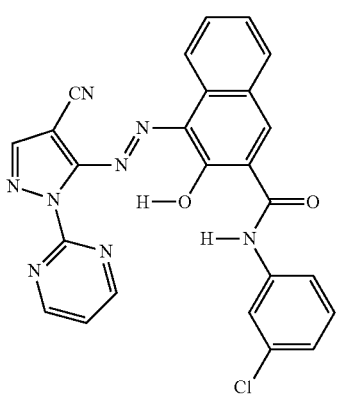
A17
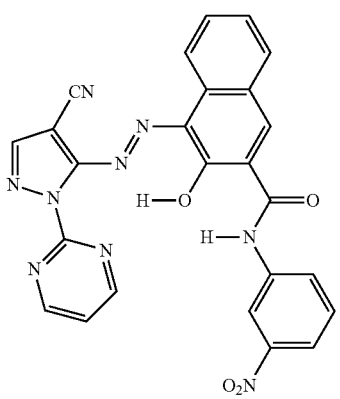
A18
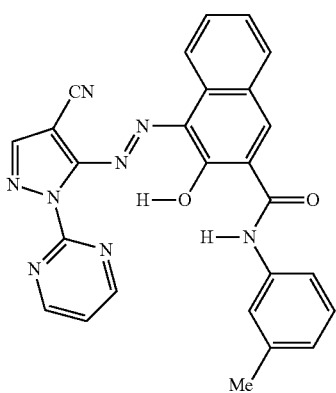

-continued
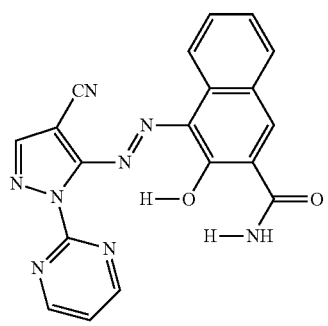
A19
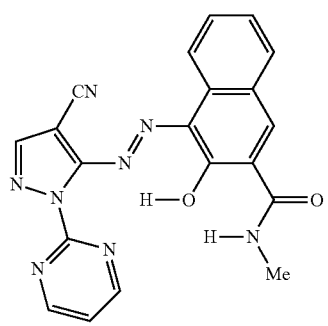
A20
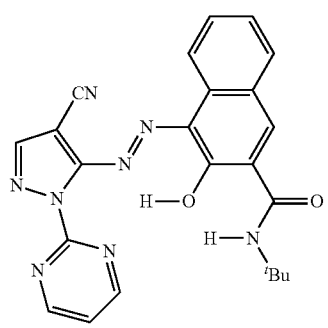
A21
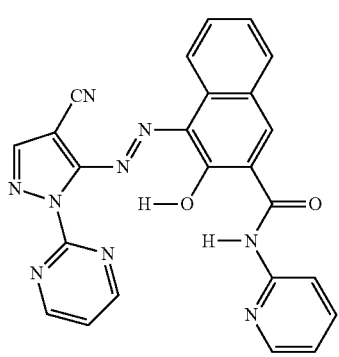
A22
-continued
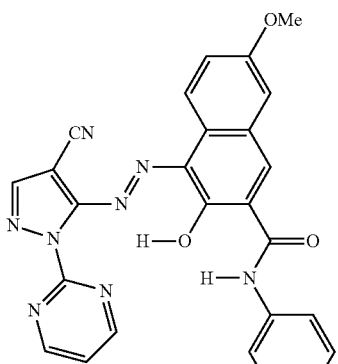
A23
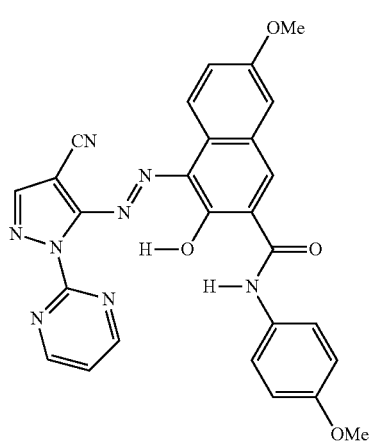
A24
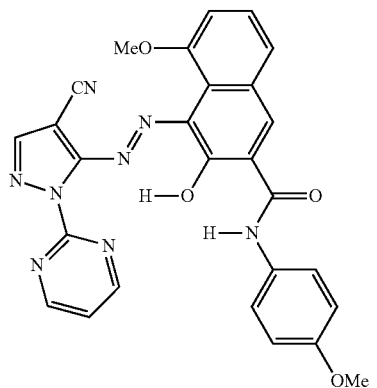
A25
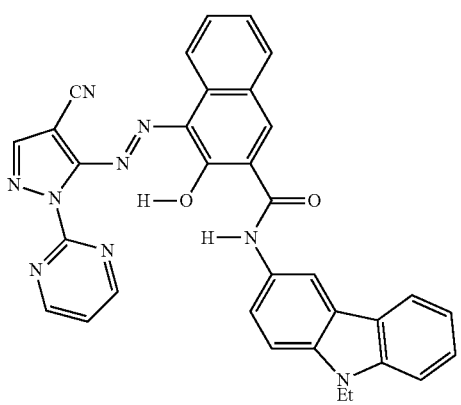
A26

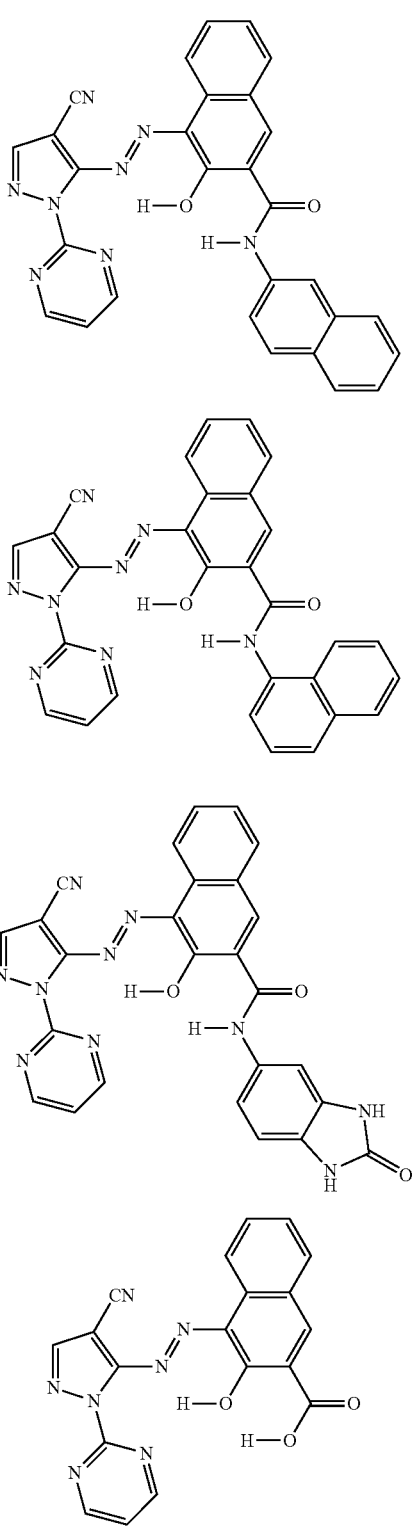

The azo pigment (A) may have a structural formula as defined by formula (1) or may be a tautomer of formula (1) and may exist in any crystal form called "polymorph".

Polymorphism means that crystals having the same chemical composition can be different from each other in the conformation of building block (molecules or ions) in the crystal. Chemical and physical properties of the pigments are decided by the crystal structure, and polymorphic forms of the same pigment can be discriminated from each other by rheology, color, and other color characteristics. Also, different polymorphic forms can be confirmed by X-Ray Diffraction (results of powder X-ray diffractiometry) or by X-Ray Analysis (results of X-ray analysis of crystal structure).

In the case where the pigments of the invention represented by the general formula (1) exhibit polymorphism, they may be in any polymorphic forms and may be a mixture of two or more polymorphic forms. However, pigments wherein a single crystal form is predominant are preferred. That is, pigments not contaminated with polymorphic form crystals are preferred. The content of the azo pigment having a single crystal form is from 70% to 100%, preferably from 80% to 100%, more preferably from 90% to 100%, still more preferably from 95% to 100%, particularly preferably 100%, based on the entire azo pigment. When the azo pigment contains a single crystal form azo pigment as a major component, regularity of alignment of the pigment molecules is improved, and the intramolecular and intermolecular interaction is enhanced, thus a high-level three-dimensional network being easily formed. As a result, performances required for pigments, such as hue, light fastness, heat fastness, humidity fastness, fastness to an oxidative gas, and solvent resistance, are improved, thus the above-described content being preferred.

The mixing ratio of polymorphic forms in the azo pigment can be confirmed from values obtained by physicochemical measurement such as X-ray crystal structure analysis of single crystal, powder X-ray diffractometry (XRD), microscopic photography of the crystals (TEM), or IR (KBr method).

Control of the above-described tautomerism and/or polymorphism may be achieved by controlling production conditions upon coupling reaction.

With those which have acid groups among the azo pigments of the invention represented by the general formula (1), part or all of the acid groups may be in a salt form, or the pigment may be a mixture of a salt type pigment and a free acid type pigment. Examples of the salt type include salts of an alkali metal such as Na, Li, or K, salts of ammonium optionally substituted by an alkyl group or a hydroxyalkyl group, and salts of an organic amine. Examples of the organic amine include a lower alkyl amine, a hydroxyl-substituted lower alkyl amine, a carboxy-substituted lower alkyl amine, and a polyamine having 2 to 10 alkyleneimine units containing 2 to 4 carbon atoms. With these salt type pigments, they are not necessarily limited to one as to kind, but may be in a mixture of two or more thereof.

Further, as to the structure of the pigment to be used in the invention, in the case where plural acid groups exist in one molecule, the plural acid groups may be of a salt type or an acid type, and may be different from each other.

The azo pigments represented by the foregoing general formula (1) may be hydrates which contain water molecules within the crystal. The azo pigment (A) of formula (1) is prepared by coupling reaction.

For example, in accordance with the reaction scheme shown below, a heterocyclic amine represented by formula (10) is diazotized in a nonaqueous acidic system, and the resulting diazonium salt is subjected to coupling reaction with a coupler compound represented by formula (11) in an acidic condition. The reaction mixture is worked up in a usual manner to give an azo pigment of formula (1).

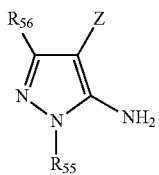

Formula (10)

In formula (10), $R_{55}$, $R_{56}$ and Z have the same meaning as defined in formula (1).

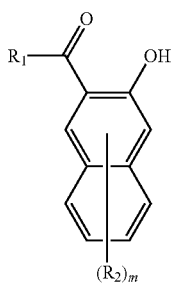

Formula (11)

In formula (11), $R_1$, $R_2$ and m have the same meaning as defined in formula (1). The reaction scheme is shown below.

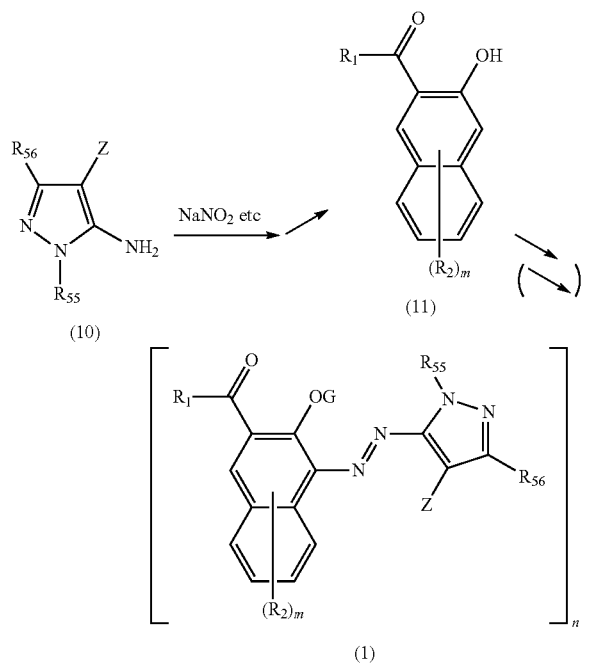

In the above scheme, $R_{55}$, $R_{56}$, Z, $R_1$, $R_2$, and m are as defined above.

While some of the heterocyclic amines of formula (10) are commercially available, they are usually prepared by commonly employed known methods, for example, the method described in Japanese patent 4022271. The coupler compound of formula (11) may be purchased commercially or prepared in accordance with the method taught in JP 2008-13472A or modification thereof. The diazotization reaction of the heterocyclic amine shown in the reaction scheme above is carried out by, for example, in an acidic solvent (e.g., sulfuric acid, phosphoric acid, or acetic acid) in the presence of a reagent, such as sodium nitrite, nitrosylsulfuric acid, or isoamyl nitrite, at 15° C. or lower for about 10 minutes to 6 hours. The coupling reaction between the resulting diazonium salt and the compound of formula (11) is carried out at 40° C. or lower, preferably 25° C. or lower, for about 10 minutes to 12 hours.

The azo compound of formula (1) wherein n is greater than 2 is synthesized in accordance with the reaction scheme shown above, except for using a compound of formula (10) or (11) wherein $R_1$, $R_2$, $R_{55}$, $R_{56}$, or Z has introduced thereto a di-, tri-, or tetravalent linking group forming a dimer, a trimer, or a tetramer.

(2) Coloring Agent (B)

Next, the coloring agent (B) represented by formula (2) (hereinafter, called "coloring agent (B)" or "coloring agent") will be described below.

By combining the coloring agent (B) is included in the azo pigment (A), there can provide a pigment composition that provides an image recording material or a color filter with good color characteristics and excellent gloss without causing flooding and floating of pigment due to flocculation. Using the coloring agent (B) also improves the storage stability with time of the pigment composition. That is, in the preparation of a pigment composition, the coloring agent (B) is mixed with the azo pigment (A), whereupon the coloring agent (B) is adsorbed onto the active sites of the azo pigment to suppress crystal growth of the pigment. As a result, the pigment is prevented from reducing in dispersibility with time and thereby from settling out of the pigment. Furthermore, the coloring agent (B) has excellent tinctorial strength and, when combined with the pigment of the invention, provides a pigment composition excellent in hue.

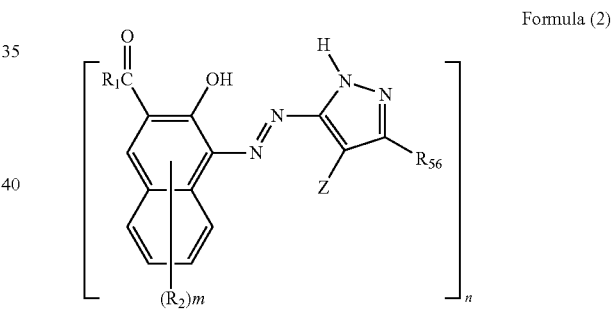

Formula (2)

In formula (2), $R_1$, $R_2$, $R_{56}$, Z, m, and n are as defined above.

In view of the effects of the invention, it is preferred for the coloring agent (B) to have a ratio of the total number of carbon atoms to the number of azo groups of 40 or less, more preferably 30 or less. From the same viewpoint, it is preferred for the coloring agent (B) to have a ratio of the molecular weight to the number of azo groups of 700 or less. In view of the effects of the invention, the coloring agent (B) is preferably free from an ionic hydrophilic group, such as sulfo or carboxyl.

The coloring agent as defined by formula (2) embraces all tautomers of formula (2). Formula (2) represents just one of limiting structure, so that the coloring agent (B) for use in the invention may be any one of such tautomers or may be a mixture of a plurality of such tautomers.

Specific examples of the coloring agent (B) represented by the foregoing general formula (2) will be shown below. However, the coloring agent to be used in the invention are not limited only to the following examples. Also, it is needless to say that, although the structures of the following specific examples are shown in the form of limiting structure among several tautomer forms which are possible in view of chemical structure, the coloring agent may be tautomers of other structure than the shown ones.
-continued
B1
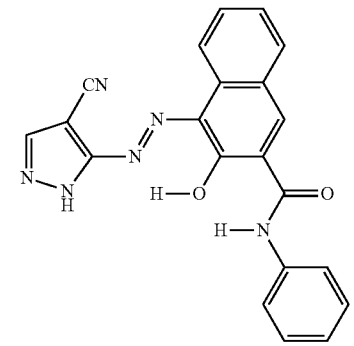
B2
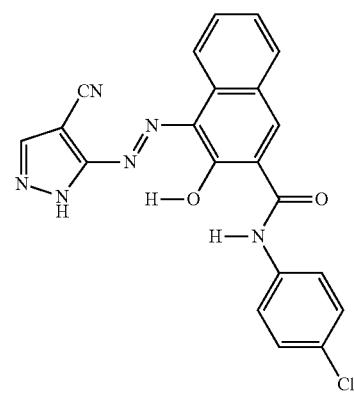
B3
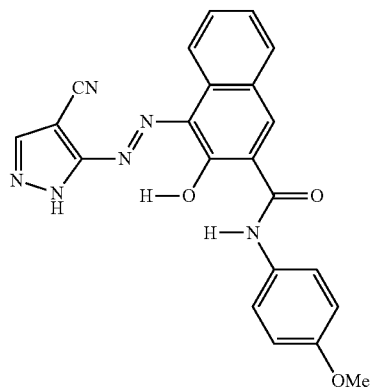
B4
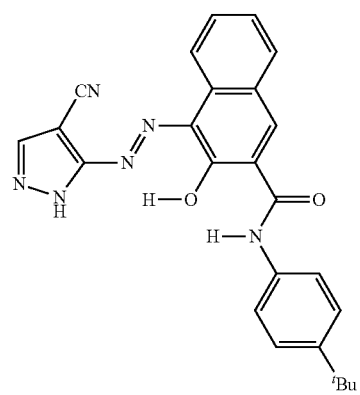
B5
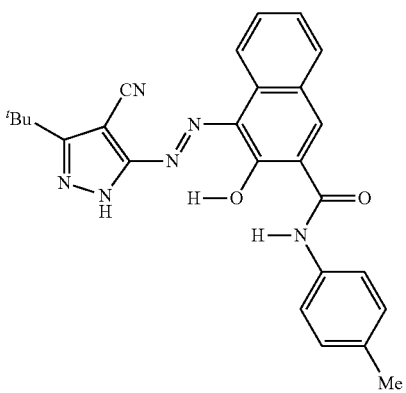
B6
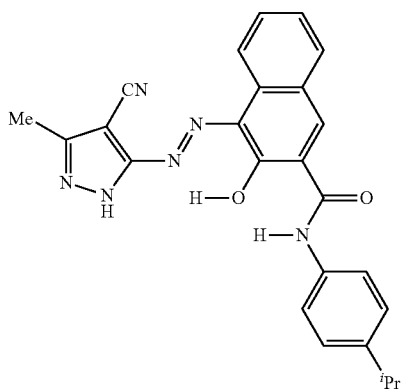
B7
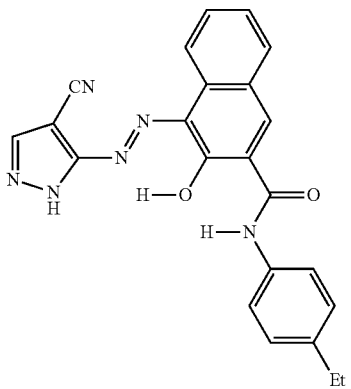
B8
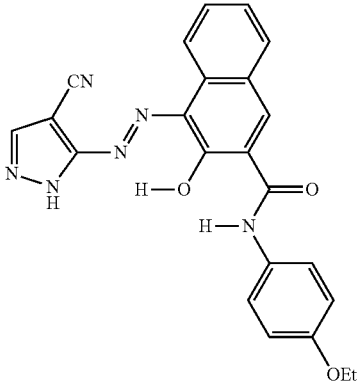

B9
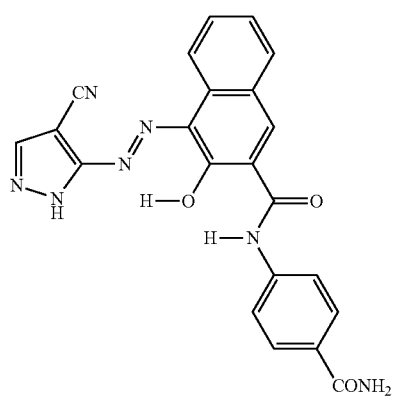
B10
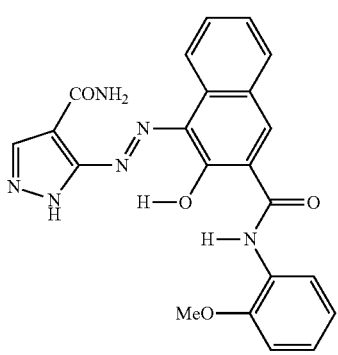
B11
B12
B13
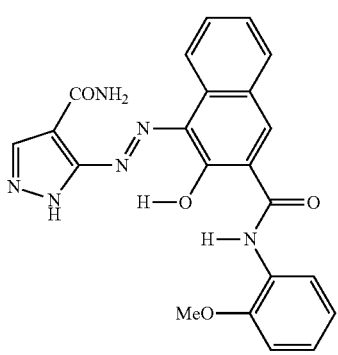
B14
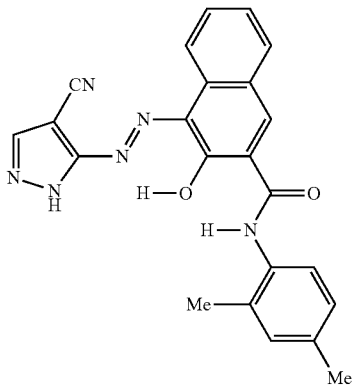
B15
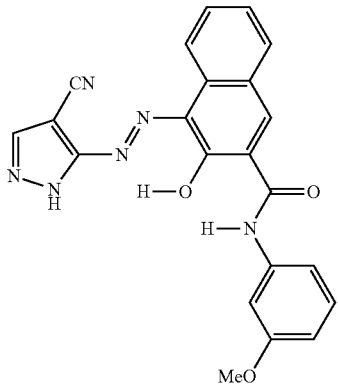
B16
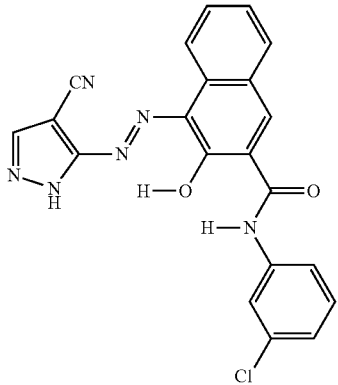

-continued
B17
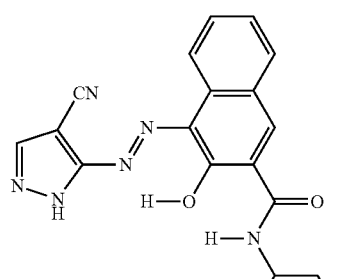
B18
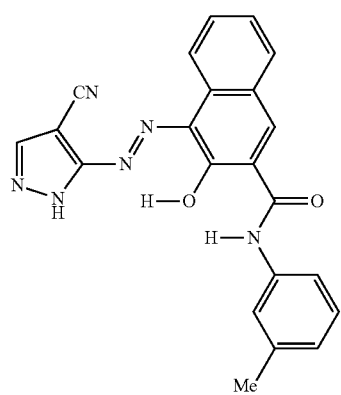
B19
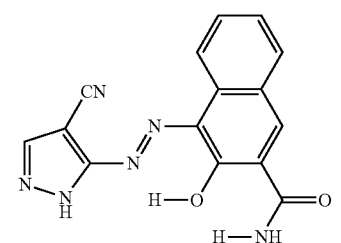
B20
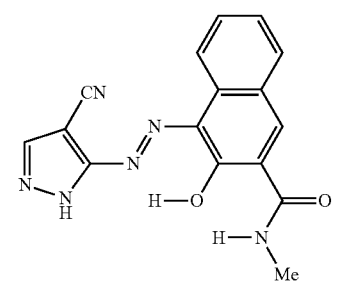
B21
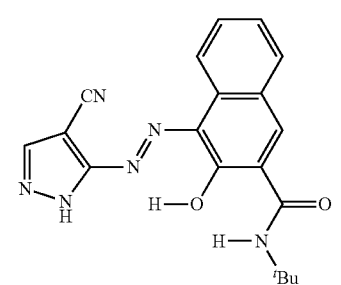
-continued
B22
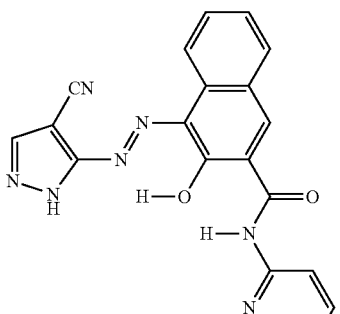
B23
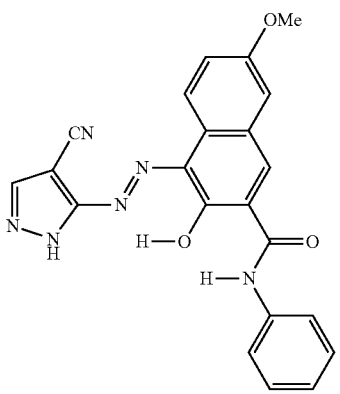
B24
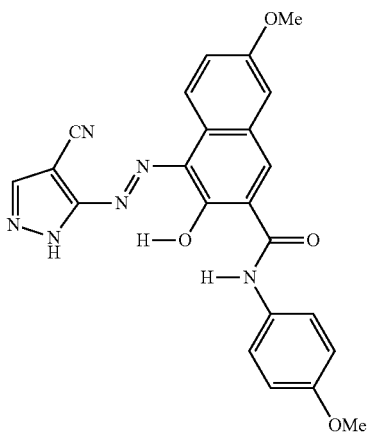
B25
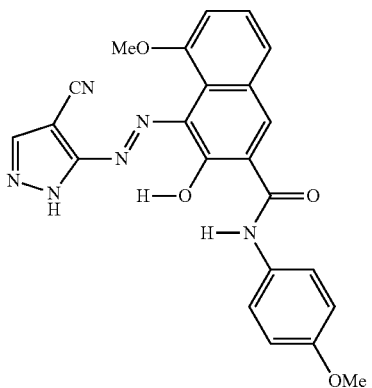

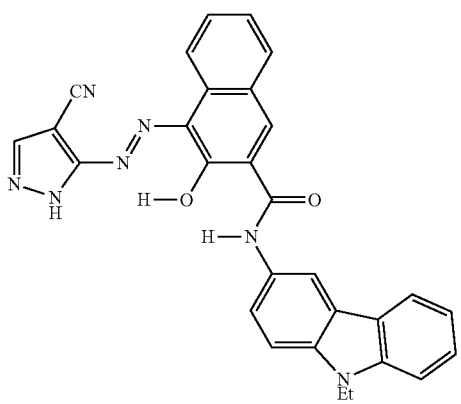

B26

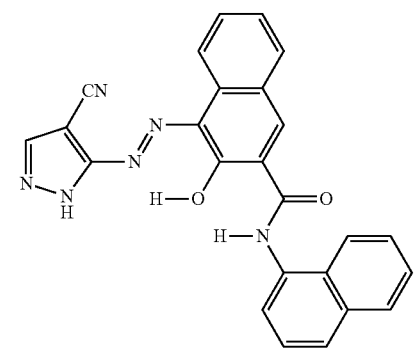

B27

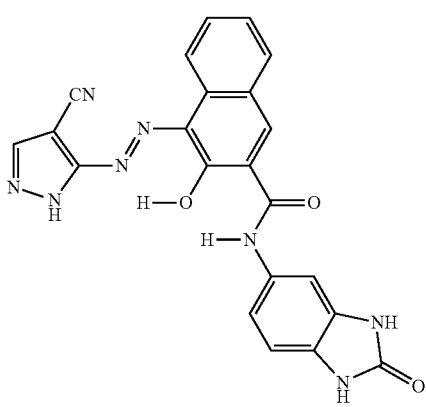

B28

B29

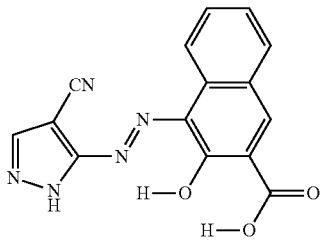

B30

The coloring agent (B) may have a structural formula as defined by formula (2) or may be a tautomer of formula (2) and may exist in any crystal form called "polymorph".

In the case where the coloring agent represented by formula (2) exhibit polymorphism, they may be in any polymorphic forms and may be a mixture of two or more polymorphic forms. However, the coloring agent wherein a single crystal form is predominant are preferred. That is, the coloring agent is not contaminated with polymorphic form crystals are preferred. The content of the coloring agent having a single crystal form is from 70% to 100%, preferably from 80% to 100%, more preferably from 90% to 100%, still more preferably from 95% to 100%, particularly preferably 100%, based on the entire azo pigment.

Control of the above-described tautomerism and/or polymorphism may be achieved by controlling production conditions upon coupling reaction.

With those which have acid groups among the coloring agent of the invention represented by the formula (2) part or all of the acid groups may be in a salt form, or the pigment may be a mixture of a salt type pigment and a free acid type pigment. Examples of the salt type include salts of an alkali metal such as Na, Li, or K, salts of ammonium optionally substituted by an alkyl group or a hydroxyalkyl group, and salts of an organic amine. Examples of the organic amine include a lower alkyl amine, a hydroxyl-substituted lower alkyl amine, a carboxy-substituted lower alkyl amine, and a polyamine having 2 to 10 alkyleneimine units containing 2 to 4 carbon atoms. With these salt type pigments, they are not necessarily limited to one as to kind, but may be in a mixture of two or more thereof.

Further, as to the structure of the coloring agent to be used in the invention, in the case where plural acid groups exist in one molecule, the plural acid groups may be of a salt type or an acid type, and may be different from each other.

The coloring agent (B) may exist in the form of a hydrate (i.e., a crystal containing water of crystallization).

The coloring agent (B) is prepared by coupling reaction similarly to the azo pigment (A). That is, the coloring agent (B) is obtained in the same manner as described above, except for replacing the heterocyclic amine of formula (10) with a heterocyclic amine of formula (10) wherein the substituent $R_{55}$ is changed to a hydrogen atom.

(3) Additive (C)

Next, (C) at least one selected from the group consisting of an additive represented by formula (3) and an additive represented by formula (4) (hereinafter, called "additive (C)" or "additive") will be described below.

By combining the additive (C) with the azo pigment (A), there can provide a pigment composition that provides a recorded image or a color filter with good sharpness and excellent gloss without causing flooding and floating of pigments due to flocculation. Using the additive (C) also improves the storage stability with time of the pigment composition. That is, in the preparation of a pigment composition, the additive (C) is mixed with the azo pigment (A), whereupon the additive (C) is adsorbed onto the active sites of the azo pigment to suppress further crystal growth of the pigment thereby to improve the storage stability with time of the pigment composition.

The additive of formula (3) is described first.

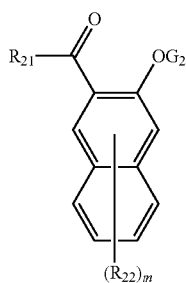

Formula (3)

In formula (3), $G_2$ is a hydrogen atom, an aliphatic group, an aryl group, or a heterocyclic group; $R_{21}$ is an amino group, an aliphatic oxy group, an aliphatic group, an aryl group, or a heterocyclic group; $R_{22}$ is a substituent; and m is an integer of 0 to 5; and formula (3) has no ionic hydrophilic group.

The aliphatic group as represented by $G_2$ may be substituted or unsubstituted and saturated or unsaturated. The substituent on the aliphatic group may be any of the above-defined substituents. Examples of suitable substituents include a hydroxyl group, an aliphatic oxy group, a carbamoyl group, an aliphatic oxycarbonyl group, an aliphatic thio group, an amino group, an aliphatic amino group, an acylamino group, and a carbamoylamino group. The aliphatic group as $G_2$ preferably contains 1 to 8 carbon atoms, more preferably 1 to 4 carbon atoms. Examples of the aliphatic group are methyl, ethyl, vinyl, cyclohexyl, and carbamoylmethyl.

The aryl group as $G_2$ may be a fused ring system and may have any of the substituents defined above. Examples of suitable substituents include a nitro atom, a halogen atom, an aliphatic oxy group, a carbamoyl group, an aliphatic oxycarbonyl group, an aliphatic thio group, an amino group, an aliphatic amino group, an acylamino group, and a carbamoylamino group. The aryl as $G_2$ is preferably an aryl group having a total of 6 to 12 carbon atoms, more preferably an aryl group having a total of 6 to 10 carbon atom, such as phenyl, 4-nitrophenyl, 4-acetylaminophenyl, or 4-methanesulfonylphenyl.

The heterocyclic group as $G_2$ may be a fused ring system, may be saturated or unsaturated, and may have any of the substituents defined above. Examples of suitable substituents include a halogen atom, a hydroxyl group, an aliphatic oxy group, a carbamoyl group, an aliphatic oxycarbonyl group, an aliphatic thio group, an amino group, an aliphatic amino group, an acylamino group, and a carbamoylamino group. The heterocyclic group as $G_2$ is preferably a heterocyclic group having a total of 2 to 12 carbon atoms and bonded at the carbon atoms thereof, more preferably a 5- or 6-membered heterocyclic group having a total of 2 to 10 carbon atoms bonded at its carbon atom, such as 2-tetrahydrofuryl or 2-pyridyl. In terms of the effects of the invention, $G_2$ is preferably a hydrogen atom.

The amino group, aliphatic oxy group, aliphatic group, aryl group, and heterocyclic group as represented by $R_{21}$ are the same as described with respect to $R_1$ of formula (1). In view of the effects of the invention, $R_{21}$ is preferably an optionally substituted amino group or a saturated nitrogen-containing heterocyclic group bonded at the nitrogen atom thereof, more preferably optionally substituted amino group.

The substituent as represented by $R_{22}$ is preferably the same as described with reference to $R_2$ in formula (1).

The additive represented by formula (4) is then described.

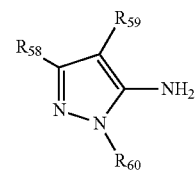

Formula (4)

In formula (4), $R_{60}$ represents a hydrogen atom or a substituent; $R_{58}$ and $R_{59}$ each independently represent a hydrogen atom or a substituent; and $R_{58}$ and $R_{59}$ may be taken together to form a 5- or 6-membered ring.

The definition and preferred examples of the substituent as $R_{58}$ are the same as described with respect to $R_{56}$ in formula (1).

The substituent as $R_{59}$ may be any of the substituents defined above. In terms of the effects of the invention, $R_{59}$ is preferably a heterocyclic group or an electron-withdrawing group having a Hammett constant σp of 0.2 or greater, particularly an electron-withdrawing group having a Hammett constant σp of 0.3 or greater. The upper limit of the σp value is preferably 1.0.

The definition and preferred examples of the substituent as $R_{60}$ are the same as described with respect to $R_{55}$ in formula (1).

Examples of electron withdrawing groups whose Hammett constant σp is 0.20 or greater as represented by $R_{59}$ include an acyl group, an acyloxy group, a carbamoyl group, an alkyloxycarbonyl group, an aryloxycarbonyl group, a cyano group, a nitro group, a dialkylphosphono group, a diarylphosphono group, a diarylphosphinyl group, an alkylsulfinyl group, an arylsulfinyl group, an alkylsulfonyl group, an arylsulfonyl group, a sulfonyloxy group, an acylthio group, a sulfamoyl group, a thiocyanate group, a thiocarbonyl group, a haloalkyl group, a haloalkoxy group, a haloaryloxy group, a haloalkylamino group, a haloalkylthio group, an aryl group substituted with another electron withdrawing group having σp of 0.2 or greater, a heterocyclic group, a halogen atom, an azo group, and a selenocyanato group.

In view of the effects of the invention, $R_{59}$ is preferably optionally substituted acyl group having a total of 2 to 6 carbon atoms (e.g., acetyl or propanoyl), optionally substituted carbamoyl group having a total of 1 to 7 carbon atoms (e.g., carbamoyl, N-methylcarbamoyl, or N,N-dimethylcarbamoyl), optionally substituted aliphatic oxycarbonyl group having a total of 2 to 7 carbon atoms (e.g., methoxycarbonyl, ethoxycarbonyl, or allyloxycarbonyl), a cyano group, optionally substituted alkylsulfonyl group having a total of 1 to 6 carbon atoms (e.g., methanesulfonyl or propanesulfonyl), or optionally substituted sulfamoyl group having a total of 0 to 6 carbon atoms (e.g., sulfamoyl or methylsulfamoyl), with a cyano group or an alkylsulfonyl group being more preferred, and with a cyano group being even more preferred.

Specific examples of the additive (C) represented by the foregoing formulae (3) and (4) will be shown below. However, the additive to be used in the invention are not limited only to the following examples. Also, it is needless to say that, although the structures of the following specific examples are shown in the form of limiting structure among several tautomer forms which are possible in view of chemical structure, the additive may be tautomers of other structure than the shown ones.
C1
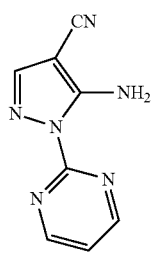
C2
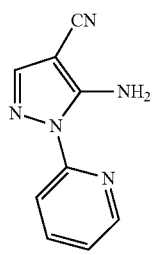
C3
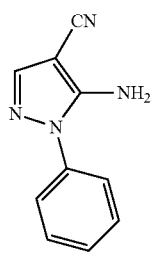
C4
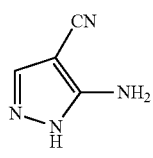
C5
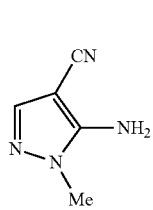
C6
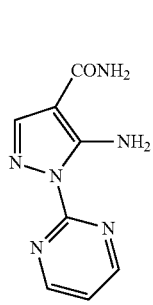
C7
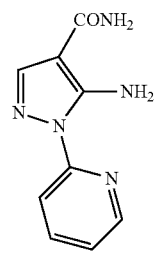
C8
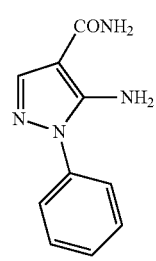
C9
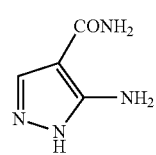
C10
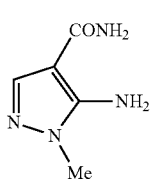
C11
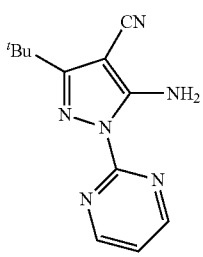
C12
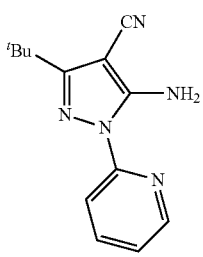
C13
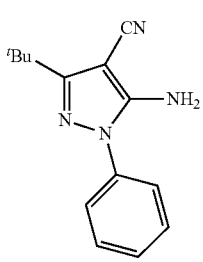

C14 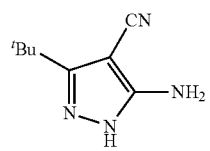
C15 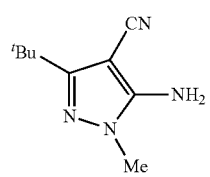
C16 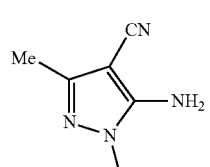
C17 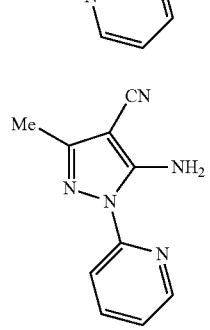
C18 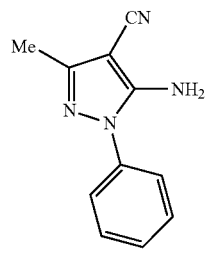
C19 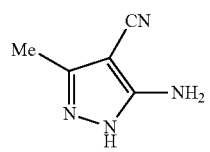
C20 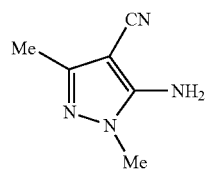
C21 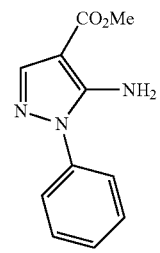
C22 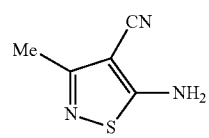
C23 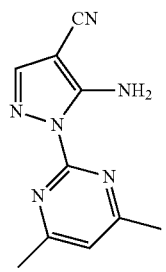
C24 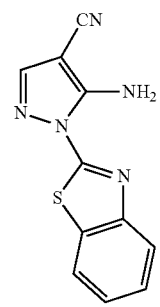
C25 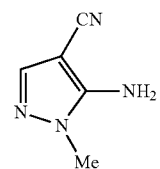
C26 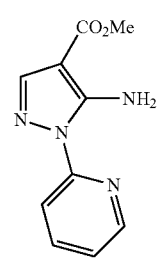

| | |
|---|---|
| C27 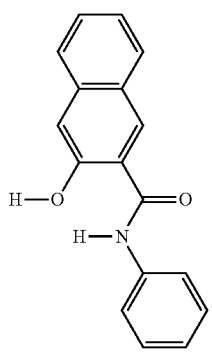 | C31 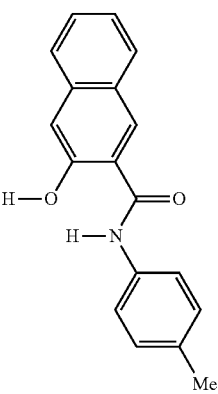 |
| C28 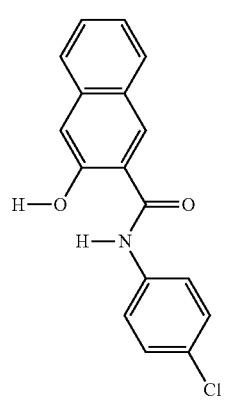 | C32 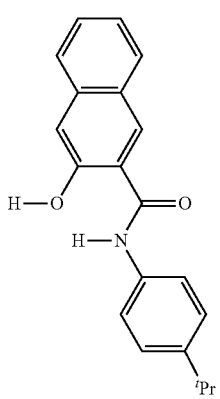 |
| C29 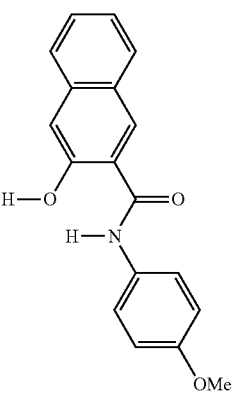 | C33 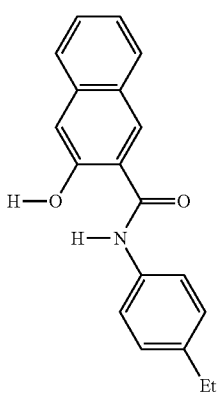 |
| C30 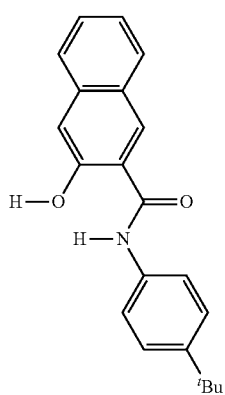 | C34 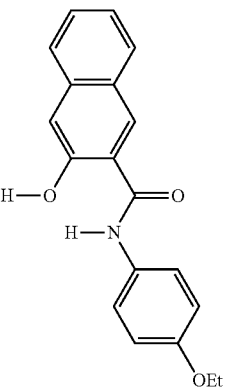 |

C35
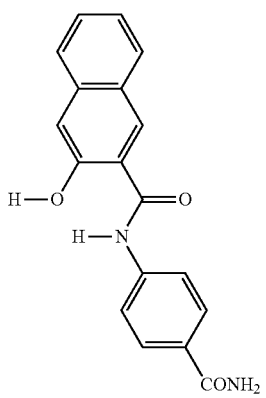
C36
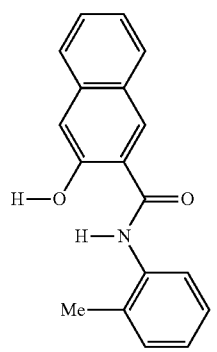
C37
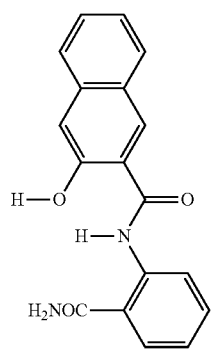
C38
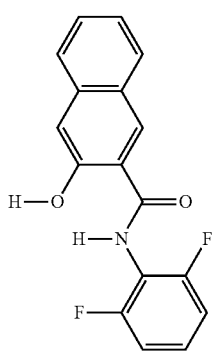
C39
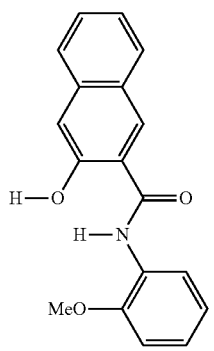
C40
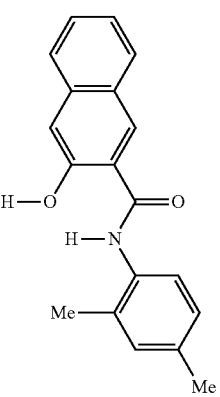
C41
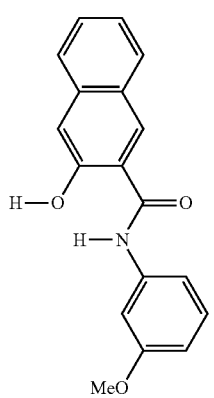
C42
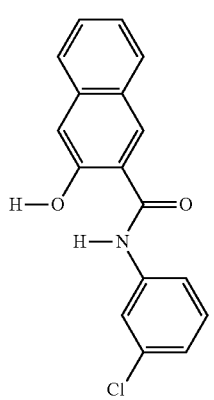

C43
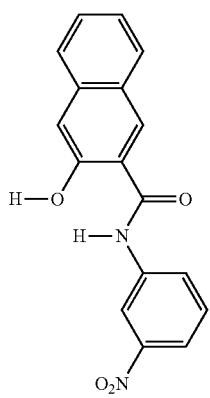
C44
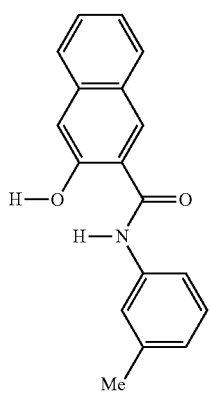
C45
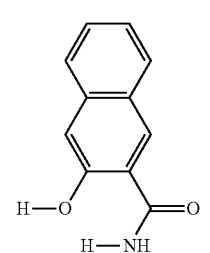
C46
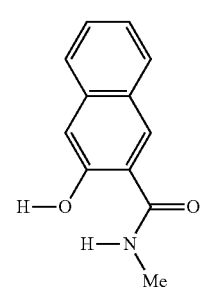
C47
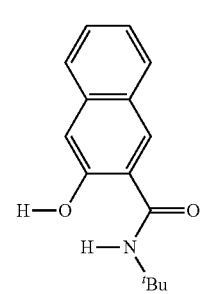
C48
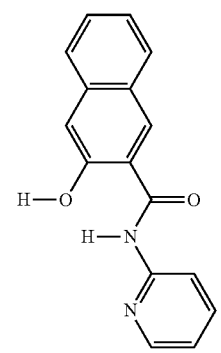
C49
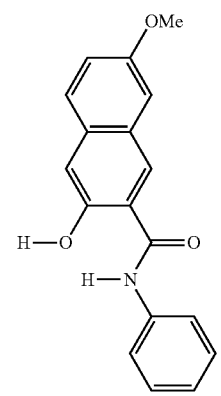
C50
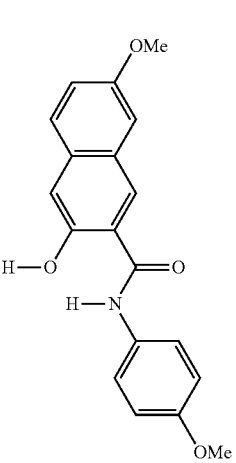
C51
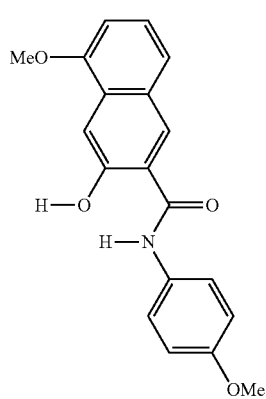

C52 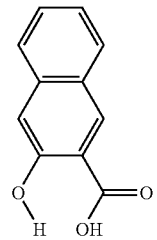

C53 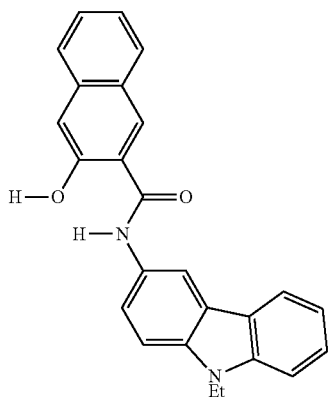

C54 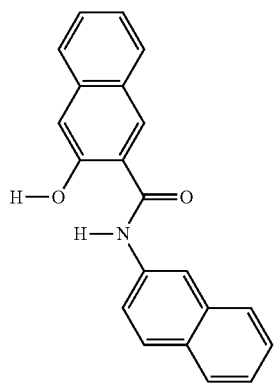

C55 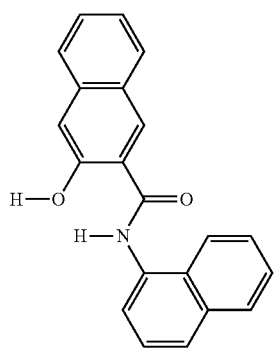

C56 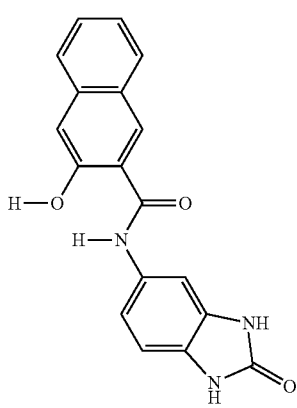

(4) Pigment Composition

As described, the pigment composition according to the invention contains the azo pigment (A), and the coloring agent (B) or (C) at least one selected from the group consisting of an additive represented by formula (3) and an additive represented by formula (4).

In a preferred embodiment, the pigment composition of the invention contains the azo pigment (A), the coloring agent (B), and (C) at least one selected from the group consisting of an additive represented by formula (3) and an additive represented by formula (4). Since the coloring agent (B) and the additive (C) used in the invention have a partial structure in common with the azo pigment (A), they readily form π-π interactions with the azo pigment (A). Therefore, the coloring agent (B) and the additive (C) are adsorbed to the crystal growth plane of the azo pigment (A) to hinder the crystal growth, thereby imparting viscosity stability with time to the azo pigment.

The coloring agent (B) and/or the additive (C) are preferably used in a total amount of 0.001% to 10% by mass, more preferably 0.001% to 5% by mass, even more preferably 0.001% to 3% by mass, relative to the amount of the azo pigment (A). With the total amount of the coloring agent (B) and the additive (C) falling in the range recited, high effects of the invention are ensured while avoiding reduction in tinctorial strength that might result from reduction in pigment concentration.

In the invention, the volume-average particle diameter of the azo pigment (A) is preferably from 10 nm to 250 nm. Additionally, the term "volume-average particle diameter of the pigment" means the particle diameter of the pigment itself or, in the case where an additive such as a dispersant is adhered to the pigment particles, means the diameter of the particle with the additive being adhered thereto. In the invention, as an apparatus for measuring the volume-average particle diameter of the pigment, a particle size analyzer of Nanotrac UPA (UPA-EX150; manufactured by Nikkiso Co., Ltd.) is used. The measurement is conducted according to a predetermined measuring method placing 3 ml of a pigment dispersion in a measuring cell. Additionally, with respect to parameters to be inputted upon measurement, an ink viscosity is used as a viscosity, and a pigment density is used as a density of the dispersed particles.

The volume-average particle diameter of the azo pigment (A) is more preferably from 10 nm to 250 nm, still more preferably from 20 nm to 230 nm. In case when the volume-average particle diameter of the particles in the pigment dispersion is less than 10 nm, storage stability might not be ensured in some cases whereas, in case when the volume-average particle diameter of the particles in the pigment dispersion exceeds 250 nm, the optical density might be reduced in some cases.

The pigment dispersion of the invention is obtained by dispersing the azo pigment (A), the coloring agent (B) and/or the additive (C), and the aqueous or non-aqueous medium using a dispersing apparatus. As the dispersing apparatus, there can be used a simple stirrer, an impeller-stirring system, an in-line stirring system, a mill system (for example, colloid mill, ball mill, sand mill, beads mill, attritor, roll mill, jet mill, paint shaker, or agitator mill), an ultrasonic wave system, a high-pressure emulsion dispersion system (high-pressure homogenizer; specific commercially available apparatuses being Gaulin homogenizer, a microfluidizer, and DeBEE2000).

In the case where the pigment composition is a pigment dispersion in an aqueous or nonaqueous medium, the total concentration of the azo pigment (A), coloring agent (B), and additive (C) in the dispersion is preferably 1% to 35%, more preferably 2% to 25%, by mass. In a case where the concentration is less than 1%, the pigment dispersion can fail to provide a sufficient image density when serving alone as ink. In a case where the concentration is more than 35%, the dispersion can have reduced stability.

It is preferred for the particles of the azo pigment (A) in the pigment composition to have an aspect ratio as close to one as possible. By using pigment particles with an aspect ratio closer to one, the pigment particles show better dispersibility in a medium to be colored and thereafter exhibit better stability of the dispersed state in the medium and are prevented from re-agglomeration.

The pigment composition of the invention is prepared by mixing the azo pigment (A), coloring agent (B), and additive (C) in any order. If desired, the azo pigment (A) may be ground to the above described preferred primary particle size before, during, or after mixing with the coloring agent (B) and/or the additive (C). The grinding may be carried out using a known means, such as a ball mill or an attritor. In order to obtain further ensured improving effects and to facilitate preparing a pigment composition having the above described preferred primary particle size, the azo pigment may be subjected to solvent salt milling together with the coloring agent (B) and/or the additive (C) prior to mixing with other components, such as a dispersing liquid medium. Solvent salt milling is a process in which a mixture of a pigment and a derivative is mixed with an inorganic salt and an organic solvent, the mixture is milled, the organic solvent and the inorganic salt are removed, and the residual solid is washed, filtered, dried, and ground.

As mentioned above, the pigment dispersion of the invention may be aqueous or non-aqueous, but is preferably an aqueous pigment dispersion. As the aqueous liquid for dispersing the pigment in the aqueous pigment dispersion of the invention, a mixture containing water as a major component and, as needed, a hydrophilic organic solvent can be used.

Examples of the hydrophilic organic solvent include alcohols such as methanol, ethanol, propanol, isopropanol, butanol, isobutanol, sec-butanol, t-butanol, pentanol, hexanol, cyclohexanol, and benzyl alcohol; polyhydric alcohols such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol; glycol derivatives such as ethylene glycol monomethyl ether, ethylene glycol monoehyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, and ethylene glycol monophenyl ether; amines such as ethanolamine, diethanolamine, triethanolamine, N-methyldiethanol amine, N-ethyldiethanol amine, morpholine, N-ethylmorpholine, ethylenediamine, diethylenetriamine, triethylenetetramine, polyethyleneimine, and tetramethylpropylenediamine; formamide; N,N-dimethylformamide; N,N-dimethylacetamide; dimethylsulfoxide; sulfolane; 2-pyrrolidone; N-methyl-2-pyrrolidone; N-vinyl-2-pyrolidone; 2-oxazolidone; 1,3-dimethyl-2-imidazolidinone; acetonitrile; and acetone.

Further, the aqueous pigment dispersion of the invention may contain an aqueous resin. As the aqueous resin, there are illustrated water-soluble resins which dissolve in water, water-dispersible resins which can be dispersed in water, colloidal dispersion resins, and a mixture thereof. Specific examples of the aqueous resins include acryl series resins, styrene-acryl series resins, polyester resins, polyamide resins, polyurethane resins, and fluorine-containing resins.

In the case where the aqueous pigment dispersion in the invention contains the aqueous resin, the content is not particularly limited. For example, the content may be from 0 to 100% by weight based on the weight of the pigment.

Further, in order to improve dispersibility of the pigment and quality of image, a surfactant and a dispersing agent may be used. As the surfactant, there are illustrated anionic, nonionic, cationic, and amphoteric surfactants, and any of them may be used. However, anionic or nonionic surfactants are preferred to use.

In the case where the aqueous pigment dispersion in the invention contains the surfactant, the content is not particularly limited. For example, the content may be from 0 to 100% by weight based on the weight of the pigment.

Examples of the anionic surfactants include aliphatic acid salts, alkyl sulfate salts, alkylbenzene sulfonate salts, alkylnaphthalene sulfonate salts, dialkyl sulfosuccinate salts, alkyldiaryl ether disulfonate salts, alkyl phosphate salts, polyoxyethylene alkyl ether sulfate salts, polyoxyethylene alkylaryl ether sulfate salts, naphthalenesulfonic acid-formalin condensates, polyoxyethylene alkyl phosphate salts, glycerol borate fatty acid esters, and polyoxyethylene glycerol fatty acid esters.

Examples of the nonionic surfactants include polyoxyethylene alkyl ethers, polyoxyethylene alkylaryl ethers, polyoxyethylene-oxypropylene block copolymers, sorbitan fatty acid esters, polyoxyethylene sorbitan fatty acid esters, polyoxyethylene sorbitol fatty acid esters, glycerin fatty acid esters, polyoxyethylene fatty acid esters, polyoxyethylene alkylamines, fluorine-containing surfactants, and silicon-containing surfactants.

The non-aqueous pigment dispersion of the invention contains the organic pigment dispersed in a non-aqueous vehicle. Examples of resin to be used as the non-aqueous vehicle include petroleum resin, casein, shellac, rosin-modified maleic acid resin, rosin-modified phenol resin, nitrocellulose, cellulose acetate butyrate, cyclized rubber, chlorinated rubber, oxidized rubber, rubber hydrochloride, phenol resin, alkyd resin, polyester resin, unsaturated polyester resin, amino resin, epoxy resin, vinyl resin, vinyl chloride, vinyl chloride-vinyl acetate copolymer, acryl resin, methacryl resin, polyurethane resin, silicone resin, fluorine-containing resin, drying oil, synthetic drying oil, styrene/maleic acid resin, styrene/acryl resin, polyamide resin, polyimide resin, benzoguanamine resin, melamine resin, urea resin, chlorinated polypropylene, butyral resin, and vinylidene chloride resin. It is also possible to use a photo-curable resin as the non-aqueous vehicle.

Examples of the solvents to be used in the non-aqueous vehicles include aromatic solvents such as toluene, xylene, and methoxybenzene; acetate series solvents such as ethyl acetate, butyl acetate, propylene glycol monomethyl ether acetate, and propylene glycol monoethyl ether acetate; propionate series solvents such as ethoxyethyl propionate; alcoholic solvents such as methanol and ethanol; ether series solvents such as butyl cellosolve, propylene glycol monomethyl ether, diethylene glycol ethyl ether, and diethylene glycol dimethyl ether; ketone series solvents such as methyl ethyl ketone, methyl isobutyl ketone, and cyclohexanone; aliphatic hydrocarbon series solvents such as hexane; nitrogen-containing compound series solvents such as N,N-dimethylformamide, γ-butyrolactam, N-methyl-2-pyrrolidone, aniline, and pyridine; lactone series solvents such as γ-butyrolactone; and carbamic acid esters such as a 48:52 mixture of methyl carbamate and ethyl carbamate.

Applications of the pigment composition of the invention typically include image recording materials for forming an image, particularly a color image. Examples of the application to image recording materials include inkjet recording materials (hereinafter described in detail), heat sensitive recording materials, pressure sensitive recording materials, electrophotographic recording materials, transfer type silver halide light-sensitive materials, printing inks, and recording pens. Applications to inkjet recording materials, heat sensitive recording materials, and electrophotographic materials are preferred, with application to inkjet recording materials being particularly preferred.

The pigment composition of the invention also finds use in making color filters for recording and reproducing color images used in solid stage imaging devices (e.g., CCDs) and display devices (e.g., LCDs and PDPs) and use in pigment dyeing liquid for dyeing various fibers.

(5) Coloring Composition

The coloring composition of the invention means a coloring composition containing at least one kind of the azo pigments or azo compounds of the invention. The coloring composition of the invention can contain a medium and, in the case where a solvent is used as the medium, the composition is particularly appropriate as an ink composition for inkjet recording. The coloring composition of the invention can be prepared by using an oleophilic medium or an aqueous medium as the medium and dispersing the azo pigment of the invention in the medium. Preferably, the aqueous medium is used. The coloring composition of the invention includes an ink composition excluding the medium. The coloring composition of the invention may contain, as needed, other additives within the range of not spoiling the advantages of the invention. Examples of the other additives include known additives (described in JP-A-2003-306623) such as a drying-preventing agent (a wetting agent), an antifading agent, an emulsion stabilizer, a penetration accelerator, an ultraviolet ray absorbent, an antiseptic, an antifungal agent, a pH-adjusting agent, a surface tension-adjusting agent, an anti-foaming agent, a viscosity-adjusting agent, a dispersing agent, a dispersion stabilizer, a rust inhibitor, and a chelating agent. In the case of aqueous ink compositions, these various additives are added directly to the ink solution. In the case of oil based ink compositions, it is general to add to a dispersion after preparing the azo pigment dispersion, but they may be added to an oil phase or an aqueous phase upon preparation.

(6) Ink for Inkjet Recording

Next, the ink of the invention for inkjet recording will be described below. The ink of the invention for inkjet recording (hereinafter also referred to as "ink") contains the pigment dispersion described above, and is preferably prepared by mixing with a water-soluble solvent or water. However, in the case where no particular problems are involved, the pigment dispersion of the invention described above may be used as such.

In view of hue, color density, once again, and transparency of an image formed on a recording medium, the content of the pigment dispersion in the ink of the invention is in the range of preferably from 1 to 100% by weight, particularly preferably from 3 to 20% by weight, most preferably from 3 to 10% by weight.

The azo pigment or azo compound of the invention is contained in an amount of from 0.1 part by weight to 20 parts by weight, more preferably from 0.2 part by weight to 10 parts by weight, still more preferably from 1 to 10 parts by weight, in 100 parts by weight of the ink composition of the invention. The ink of the invention may further contain other pigment in combination with the pigment of the invention. In the case of using two or more kinds of pigments, the total amount of the pigments is preferably within the above-described range. The ink composition of the invention can be used for forming a full-color image as well as a mono-color image.

As the water-soluble solvents to be used in the ink of the invention, polyhydric alcohols, polyhydric alcohol derivatives, nitrogen-containing solvents, alcohols, and sulfur-containing solvents are used.

Specific examples of the polyhydric alcohols include ethylene glycol, diethylene glycol, propylene glycol, butylenes glycol, triethylene glycol, 1,5-pentanediol, 1,2,6-hexanetriol, and glycerin.

Examples of the polyhydric alcohol derivatives include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and an ethylene oxide adduct of diglycerin.

Also, examples of the nitrogen-containing solvents include pyrrolidone, N-methyl-2-pyrrolidone, cyclohexylpyrrolidone, and triethanolamine, examples of the alcohols include ethanol, isopropyl alcohol, butyl alcohol, and benzyl alcohol, and examples of the sulfur-containing solvents include thiodiethanol, thiodiglycerol, sulfolane, and dimethylsulfoxide. Besides, propylene carbonate and ethylene carbonate may also be used.

The water-soluble solvents to be used in the invention may be used alone or as a mixture of two or more thereof. As to the content of the water-soluble solvent, the solvent is used in an amount of from 1% by weight to 60% by weight, preferably from 5% by weight to 40% by weight, based on the total weight of the ink. In case when the content of the water-soluble solvent in the entire ink is less than 1% by weight, there might result an insufficient optical density in some cases whereas, in case when the content exceeds 60% by weight, there might result unstable jet properties of the ink liquid in some cases due to the large viscosity of the liquid.

The preferred physical properties of the ink of the invention are as follows. The surface tension of the ink is preferably from 20 mN/m to 60 mN/m, more preferably from 20 mN/m to 45 mN/m, still more preferably from 25 mN/m to 35 mN/m. In case when the surface tension is less than 20 mN/m, the liquid might, in some cases, overflow onto the nozzle surface of the recording head, thus normal printing not being performed. On the other hand, in case when the surface tension exceeds 60 mN/m, the ink might, in some cases, slowly penetrate into the recording medium, thus the drying time becoming longer.

Additionally, the surface tension is measured under the environment of 23° C. and 55% RH by using a Wilhelmy surface tension balance as is the same described above.

The viscosity of the ink is preferably from 1.2 mPa·s to 8.0 mPa·s, more preferably from 1.5 mPa·s to 6.0 mPa·s, still more preferably from 1.8 mPa·s to 4.5 mPa·s. In case when the viscosity is more than 8.0 mPa·s, ink ejection properties might, in some cases, be deteriorated. On the other hand, in case when the viscosity is less than 1.2 mPa·s, the long-term ejection properties might be deteriorated in some cases. Additionally, the viscosity (including that to be described hereinafter) is measured by using a rotational viscometer Rheomat 115 (manufactured by Contraves Co.) at 23° C. and a shear rate of 1,400 s$^{-1}$.

In addition to the above-mentioned individual components, water is added to the ink within an amount of providing the preferred surface tension and viscosity described above. The addition amount of water is not particularly limited, but is in the range of preferably from 10% by weight to 99% by weight, more preferably from 30% by weight to 80% by weight, based on the total weight of the ink composition.

Further, for the purpose of controlling characteristic properties such as improvement of ejection properties, there can be used, as needed, polyethyleneimine, polyamines, polyvinylpyrrolidone, polyethylene glycol, cellulose derivatives such as ethyl cellulose and carboxymethyl cellulose, polysaccharides and derivatives thereof, water-soluble polymers, polymer emulsions such as an acrylic polymer emulsion, a polyurethane series emulsion, and a hydrophilic latex, hydrophilic polymer gels, cyclodextrin, macrocyclic amines, dendrimers, crown ethers, urea and derivatives thereof, acetamide, silicone surfactants, and fluorine-containing surfactants.

Also, in order to adjust electrical conductivity and pH, there can be used compounds of alkali metals such as potassium hydroxide, sodium hydroxide, and lithium hydroxide; nitrogen-containing compounds such as ammonium hydroxide, triethanolamine, diethanolamine, ethanolamine, and 2-amino-2-methyl-1-propanol; compounds of alkaline earth metals such as calcium hydroxide; acids such as sulfuric acid, hydrochloric acid, and nitric acid; and salts between a strong acid and a weak alkali, such as ammonium sulfate. Besides, pH buffers, antioxidants, antifungal agents, viscosity-adjusting agents, electrically conductive agents, and ultraviolet ray absorbents may also be added as needed.

(7) Coloring Composition for Color Filter

The coloring composition for color filter according to the invention contains the pigment composition of the invention and preferably further contains a polymerizable compound and a solvent.

The content of the azo pigment (A) in the coloring composition for color filter is preferably 0.01 to 2 parts, more preferably 0.1 to 1 part, by mass per part by mass of the polymerizable compound.

(8) Polymerizable Compounds

The polymerizable compound may properly be selected in consideration of the production process of a color filter and, as the polymerizable compound, there are illustrated photo-sensitive compounds and/or thermosetting compounds, with photo-sensitive compounds being particularly preferred.

The photo-sensitive compound is selected from at least one of photo-polymerizable resins, photo-polymerizable monomers, and photo-polymerizable oligomers, with those which have an ethylenically unsaturated bond being preferred. It suffices for the coloring composition for color filter to contain a material which becomes a resin in a cured state, and a composition containing only components which are not resinous in an uncured state is included.

As the photo-polymerizable compounds, photo-polymerizable monomers, and photo-polymerizable oligomers, there are illustrated, for example, (meth)acrylates such as 2-hydroxyethyl (meth)acrylate, 2-hydroxypropyl (meth)acrylate, 2-ethylhexyl (meth)acrylate, ethylene glycol di(meth)acrylate, diethylene glycol di(meth)acrylate, triethylene glycol di(meth)acrylate, polyethylene glycol di(meth)acrylate, pentaerythritol di(meth)acrylate, dipentaerythritol tetra(meth)acrylate, dipentaerythritol hexa(meth)acrylate, bisphenol A type epoxy di(meth)acrylate, bisphenol F type epoxy di(meth)acrylate, and bisphenol fluorene type epoxy di(meth)acrylate. Also, there are illustrated vinyl resins such as acrylic acid (co)polymers, (meth)acrylic acid (co)polymers, maleic acid (co)polymers, and resins having an ethylenic double bond in its side chain such as polyethylene oxide, polyvinylpyrrolidone, polyamide, polyurethane, polyether, polyester, etc. These may be used alone or in combination of two or more thereof. The content of the polymerizable compound is from 20 to 95% by weight, preferably from 40 to 80% by weight.

The blending ratio of the polymerizable compound is preferably from 40 to 95% by weight, more preferably from 50 to 90% by weight, based on the weight of all solid components in the composition for color filter. The composition may contain, as needed, other resins or the like. In such cases, the sum amount of the polymerizable resin and the other resins is preferably within the above-described range. Additionally, the term "all solid components" means those components which remain as solid components after drying and curing, with no solvents being contained and monomers being contained.

(9) Photo-polymerization Initiators

In the case of using a photo-sensitive compound as the photo-polymerizable compound, a photo-polymerization initiator is used together with a monomer and/or an oligomer of the photo-sensitive compound. As the photo-polymerization initiator, there are illustrated one or more members selected from among benzophenone derivatives, acetophenone derivatives, benzoin derivatives, benzoin ether derivatives, thioxanthone derivatives, anthraquinone derivatives, naphthoquinone derivatives, and triazine derivatives. Known photo-sensitizers may further be used together with these photo-polymerization initiators.

As the thermosetting resins, there are illustrated, for example, melamine resin, urea resin, alkyd resin, epoxy resin, phenol resin, cyclopentadiene resin, etc.

Additionally, in this specification and claims, the terms "photo-sensitive resins" and "thermosetting resins" mean not only cured resins but polymerizable monomers and/or oligomers as well.

Together with the above-described photo-sensitive resins and/or thermosetting resins, those other resins which are generally used in an ink, such as binder resins having an acid group, and acryl resins and urethane resins may be used.

(10) Solvent

The pigment dispersion may be an aqueous system or a non-aqueous system, which depends on the production process of the color filter. For example, in a photo lithography process, a non-aqueous system is preferred and, in an inkjet process, either system may be employed.

As a solvent for the coloring composition of the invention, there are illustrated fatty acid esters such as ethyl acetate, butyl acetate, ethylene glycol monomethyl ether acetate, and propylene glycol monomethyl ether acetate; ketones such as acetone, methyl ethyl ketone, methyl isobutyl ketone, cyclohexanone, and diacetone alcohol; aromatic compounds such as benzene, toluene, and xylene; alcohols such as methanol, ethanol, n-propanol, isopropanol, and n-butanol; glycols such as ethylene glycol, diethylene glycol, triethylene glycol, tetraethylene glycol, polyethylene glycol, propylene glycol, dipropylene glycol, tripropylene glycol, polypropylene glycol, trimethylene glycol, and hexanetriol; glycerin; alkylene glycol monoalkyl ethers such as ethylene glycol monomethyl ether, ethylene glycol monoethyl ether, diethylene glycol monomethyl ether, diethylene glycol monoethyl ether, propylene glycol monomethyl ether, and propylene glycol monoethyl ether; alkylene glycol dialkyl ethers such as triethylene glycol dimethyl ether, triethylene glycol diethyl ether, tetraethylene glycol dimethyl ether, and tetraethylene glycol diethyl ether; ethers such as tetrahydrofuran, dioxane, and diethylene glycol diethyl ether; alkanolamines such as monoethanolamine, diethanolamine, and triethanolamine; nitrogen-containing polar organic solvents such as N,N-dimethylformamide, N,N-dimethylacetamide, N-methyl-2-pyrrolidone, 2-pyrrolidone, and 1,3-dimethyl-2-imidazolidinone; water; and the like.

Of these solvents, water-soluble solvents may be mixed with water to use as an aqueous medium. Also, two or more solvents selected from the above-described solvents excluding water may be mixed to use as an oily medium.

The coloring composition in the invention for color filter preferably further contains one or more dispersants selected from among surfactants, silicone series additives, silane series coupling agents, and titanium series coupling agents. These dispersants may be used in combination of two or more thereof.

Specific examples of the aforesaid dispersants will be described below.

The surfactants are not particularly limited as long as they have surface-active action, and there can be illustrated cationic, anionic, nonionic, and amphoteric surfactants, etc. Specific examples include anionic surfactants such as alkane sulfonate salts, straight chain alkylbenzene sulfonate salts, branched alkylbenzene sulfonate salts, alkylnaphthalene sulfonate salts, naphthalenesulfonic acid salt-formaldehyde condensates, alkylsulfate salts, polyoxyethylene alkyl ether sulfate salts, alkyl phosphate salts, polyoxyethylene alkyl ether phosphate salts, and aliphatic monocarbooxylic acid salts; cationic surfactants such as alkylamine salts and quaternary amine salts; nonionic surfactants such as glycerin fatty acid esters, sorbitan fatty acid esters, polyoxyethylene alkyl ethers, polyoxyethylene alkylphenyl ethers, polyethylene glycol fatty acid esters, and polyoxyethylene sorbitan fatty acid esters; amphoteric surfactants such as alkylbetaines; and cationic, anionic, nonionic, and amphoteric high-molecular surfactants.

Specific examples of the silicone series additives include polyalkylsiloxanes, polyalkylphenylsiloxanes, polyorganosiloxanes, polydimethylsiloxane, polyorganosiloxane polyether copolymers, polyfluorosiloxanes, and organosiloxanes. These silicone series additives may be used in combination of two or more thereof.

As specific examples of the silane coupling agents, there are illustrated vinyltrimethoxysilane, vinyltriethoxysilane, vinyltris(β-methoxyethoxy)silane, β-(3,4-epoxycyclohexyl) ethyltrimethoxysilane, γ-glycidoxypropyltrimethoxysilane, γ-glycidoxypropylmethyldiethoxysilane, γ-aminopropyltriethoxysilane, N-phenyl-γ-aminopropyltrimethoxysilane, γ-methacryloxypropyltrimethoxysilane, vinyltriacetoxysilane, methyltrimethoxysilane, dimethyldimethoxysilane, phenyltrimethoxysilane, diphenyldimethoxysilane, methyltriethoxysilane, dimethyldiethoxysilane, phenyltriethoxysilane, diphenyldiethoxysilane, n-butyltrimethoxysilane, isobutyltrimethoxysilane, trimethylmethoxysilane, hydroxypropyltrimethoxysilane, n-hexadecyltrimethoxysilane, and n-octadecyltrimethoxysilane.

As specific examples of the titanium series coupling agents, there are illustrated isopropyltri(N-aminoethylaminoethyl) titanate and dibutoxybistriethanolamine titanate.

The amount of the above-described dispersant to be used is preferably from 0.1 to 100 parts by weight, particularly preferably from 0.5 to 80 parts by weight, per 100 parts by weight of the organic pigment, though depending upon kind of the dispersant to be used.

Methods of using the dispersant are not particularly limited, and may be used according to the known methods for preparing a coloring composition for photolithography process.

(12) Color Filter

The invention further provides a color filter formed by using the above-described coloring composition for color filter. The color filter shows a high contrast and good light transmittance. Specifically, it shows light transmittance of preferably 85% or more, more preferably 90% or more, at a wavelength of 650 nm.

For producing the color filter of the invention, any known process may be employed, and there are preferably illustrated a photolithography process and an inkjet process. The photolithography process and the inkjet process will be described in detail below.

1) Photolithography Method

In the case of forming a color filter according to photolithography method, a photo-sensitive resin is used as a polymerizable compound in the coloring composition of the invention for color filter. The photo-sensitive resin is contained in the coloring composition as a monomer and/or an oligomer together with a photo-polymerization initiator, and is cured by irradiation with light to form a film on a transparent substrate.

As the photo-sensitive resin, a polymer or copolymer of the aforesaid polymerizable monomer having one or more ethylenic double bond within the molecule is preferably used.

As these photo-sensitive resins (polymerizable monomers), acrylates and methacrylates are particularly preferred and, specifically, there are illustrated methyl acrylate, methyl methacrylate, butyl methacrylate, butyl acrylate, pentaerythritol tetraacrylate, pentaerythritol tetramethacrylate, pentaerythritol triacrylate, pentaerythritol trimethacrylate, dipentaerythritol hexaacrylate, dipentaerythritol hexamethacrylate, dipentaerythritol pentaacrylate, dipentaerythritol pentamethacrylate, glycerol diacrylate, glycerol dimethacrylate, 1,4-butanediol diacrylate, 1,4-butanediol dimethacrylate, bisphenol A diacrylate, and bisphenol A dimethacrylate.

In the case of using the photolithography method, a binder resin having an acidic group is used in the coloring composition of the invention for color filter in addition to the aforesaid photo-sensitive resin. As the binder resin having an acidic group, there are illustrated resins having a carboxyl group, a hydroxyl group, a sulfonic acid group, or the like, with binder resins having a carboxyl group and/or a hydroxyl group being preferred.

As the above-described binder resins having an acidic group, there are preferably used copolymers between a monomer having an ethylenic double bond, such as those which are selected from acrylates, methacrylates, styrene, vinyl acetate, vinyl chloride, N-vinylpyrrolidone, and acrylamide, and a monomer having an acidic group and an ethylenic double bond, such as those which are selected from acrylic acid, methacrylic acid, p-styrenecarboxylic acid, p-styrenesulfonic acid, p-hydroxystyrene, and maleic anhydride.

The binder resin having an acidic group is used in an amount of preferably from 0.5 to 4 parts by weight, particularly preferably from 1 to 3 parts by weight, per 1 part by weight of the photo-sensitive resin (polymerizable monomer).

As a solvent to be used in the coloring composition for the photolithography method, there are illustrated one or more oily media selected from fatty acid esters, ketones, aromatic compounds, alcohols, glycols, glycerin, alkylene glycol monoalkyl ethers, alkylene glycol dialkyl ethers, ethers, and nitrogen-containing polar organic solvents.

The amount of these solvents to be used is preferably a 3- to 30-fold amount, particularly preferably a 4- to 15-fold amount, based on the whole weight of components other than the solvent in the coloring composition.

Also, the coloring composition in the invention for use in the photolithography method may contain, as needed, known additives in addition to the aforesaid components, such as a wetting agent, an antifading agent, an emulsion stabilizer, an ultraviolet ray absorbent, an antiseptic, an antifungal agent, a pH-adjusting agent, a surface tension-adjusting agent, an anti-foaming agent, a viscosity-adjusting agent, a dispersion stabilizer, a rust inhibitor, and a chelating agent (described in JP-A-2003-306623). These various additives may be added to the oil phase or the aqueous phase upon preparation.

The coloring composition of the invention for color filter can be prepared by the process including a step of uniformly dispersing and dispersing the aforementioned pigment dispersion of the present invention, the polymerizable compound, a solvent, and other various additives using an apparatus such as a beads mill, a ball mill, a sand mill, a two-roll mill, a three-roll mill, a homogenizer, a kneader, or a vibration dispersing apparatus; and a step of adjusting the viscosity using the aforesaid solvent or the like.

As a method for forming a color filter on a display substrate by using the coloring composition of the invention for color filter, a known photolithography method may be employed. For example, a color filter is obtained by a process including a step of uniformly coating the coloring composition of the invention on a display substrate according to a known method such as a spraying method, a bar-coating method, a roll-coating method, or a spin-coating method; a step of removing the solvent in the ink by heating; a step of exposing a color filter pattern on the display substrate using a high-pressure mercury lamp or the like; an alkali-developing step; a washing step; and a baking step.

2) Inkjet Method

In the case of forming a color filter by employing an inkjet method, the polymerizable compound in the coloring composition of the invention for color filter is not particularly limited, and any conventionally known one which has been used in an ink for inkjet system may be used. A monomer of a photo-sensitive resin and/or a thermosetting resin is preferably used.

As these photo-sensitive resins, there are illustrated acryl resins, methacryl resins, and epoxy resins, with acryl resins and methacryl resins being preferably used. The acryl resins and the methacryl resins are preferably those which are obtained by using a combination of a photo-polymerizable monomer selected from among acrylates, methacrylates, urethane acrylate, urethane methacrylate, acrylamide, methacrylamide, alkyl acrylates, benzyl methacrylate, benzyl acrylate, aminoalkyl methacrylates, etc. and a photo-polymerization initiator selected from among benzophenone derivatives, acetophenone derivatives, benzoin derivatives, benzoin ether derivatives, thioxanthone derivatives, anthraquinone derivatives, naphthoquinone derivatives, and triazine derivatives. Also, in addition to the above-described photo-polymerizable monomers, photo-polymerizable monomers having a hydrophilic group, such as acrylic acid, methacrylic acid, maleic acid, and vinyl acetate may further be added.

As the thermosetting resins, there are illustrated, for example, melamine resin, urea resin, alkyd resin, epoxy resin, phenol resin, and cyclopentadiene resin.

In the case of employing the inkjet process, the solvent to be used in the coloring composition may be an oily medium or an aqueous medium, with an aqueous medium being more preferably used. As the aqueous medium, water or a mixed solvent of water and a water-soluble organic solvent is used, with a mixed solvent of water and a water-soluble organic solvent being preferred. Also, it is preferred to use deionized water.

The oily medium to be used in the above-described coloring composition is not particularly limited, but there can be used, for example, those which have been illustrated as solvents for the coloring composition for use in photolithography.

Solvents to be used in the aqueous medium are selected from among those alcohols, ketones, ethers, glycols, glycerin, alkylene glycol monoalkyl ethers, alkylene glycol dialkyl ethers, alkanolamines, nitrogen-containing polar organic solvents, etc. which are soluble in water. These water-soluble organic solvents may be used alone or in combination of two or more thereof.

The amount of these solvents to be used is not particularly limited, but it is preferred to properly adjust the amount so that the viscosity of the coloring composition at room temperature becomes 20 mPa·s or less, preferably 10 mPa·s or less.

The coloring composition of the invention can be prepared by a process including a step of dispersing and mixing components as is the same with the coloring composition for use in photolithography process. Upon dispersing, a dispersant may be contained, as needed, as is the same with the case of photolithography.

Also, the coloring composition in the invention may contain, as needed, known additives in addition to the aforesaid components, such as a wetting agent, an antifading agent, an emulsion stabilizer, an ultraviolet ray absorbent, an antiseptic, an antifungal agent, a pH-adjusting agent, a surface tension-adjusting agent, an anti-foaming agent, a viscosity-adjusting agent, and a dispersion stabilizer.

Methods for forming a color filter using the coloring composition obtained as described above are not particularly limited, and any known method of forming a color filter according to the inkjet system may be employed. For example, a color filter can be formed by a method including a step of forming a predetermined color filter pattern in a droplet state on a display substrate, a step of drying this, and a step of heat treatment, irradiation with light, or both of them to cure the color filter pattern on the display substrate, thus forming a film.

Although description has been made hereinbefore with respect to photolithography method and inkjet method, the color filter of the invention may be obtained by other method.

In the case of employing other color filter-forming methods (for example, various printing methods such as an offset printing method) than the above-described methods, coloring compositions for color filter and resulting color filters fall within the scope of the invention as long as the coloring composition contains the aforesaid polymerizable compound and the solvent and contains the azo pigment compound by formula (1) as a coloring material.

For example, components such as polymerizable compounds, solvents, and additives and formulation upon formation of a color filter may be selected according to conventional examples, and are not limited only to those which have been illustrated with respect to the above-described photolithography method and inkjet method.

The color filter obtained as described above forms pixels together with color filter patterns of G (green) and B (blue) according to a known method. Such filter has an extremely high transparency and excellent spectral characteristics and can provide a liquid crystal display which can display a distinct image with less polarization extinction.

The color filter may also be fabricated by a method including forming a pattern of a photoresist, followed by coloring or a method in which a pattern is formed of a photoresist containing a colorant as disclosed in JP 4-163552A, JP 4-128703A, and JP 4-175753A. Either of these methods is usable in introducing the pigment composition of the invention to color filters. Preferred techniques are the method of JP 4-175753A and the resist composition and the color filter formation using the same described in JP 6-35182A. The resist composition of JP 4-175753A is a positive resist composition comprising a thermosetting resin, a quinonediazide compound, a crosslinking agent, a colorant, and a solvent, and the color filter formation using the resist composition comprises applying the resist composition to a substrate, exposing the applied resist composition to light through a mask, developing the exposed area to form a positive resist pattern, exposing the entire resistant pattern to light, and curing the exposed resist pattern. RGB primary color filters or YMC complementary color filters are obtained by forming a black matrix in a usual manner. In applications to color filters, the content of the azo pigment (A) in the pigment composition of the invention is not limited but is preferably in the range of from 0.1% to 50% by mass.

The kinds and amounts of the thermosetting resin, quinonediazide compound, crosslinking agent, and solvent used in the above described method of color filter formation are preferably selected from the ranges given in the patent document cited above.

EXAMPLES

The present invention will now be illustrated in greater detail with reference to Examples, but it should be understood that the invention is not deemed to be limited thereto. Unless otherwise noted, all the parts and percents are by mass.

Synthesis Example 1

Synthesis of Compound A3

Compound A3 is synthesized in accordance with the following reaction scheme.

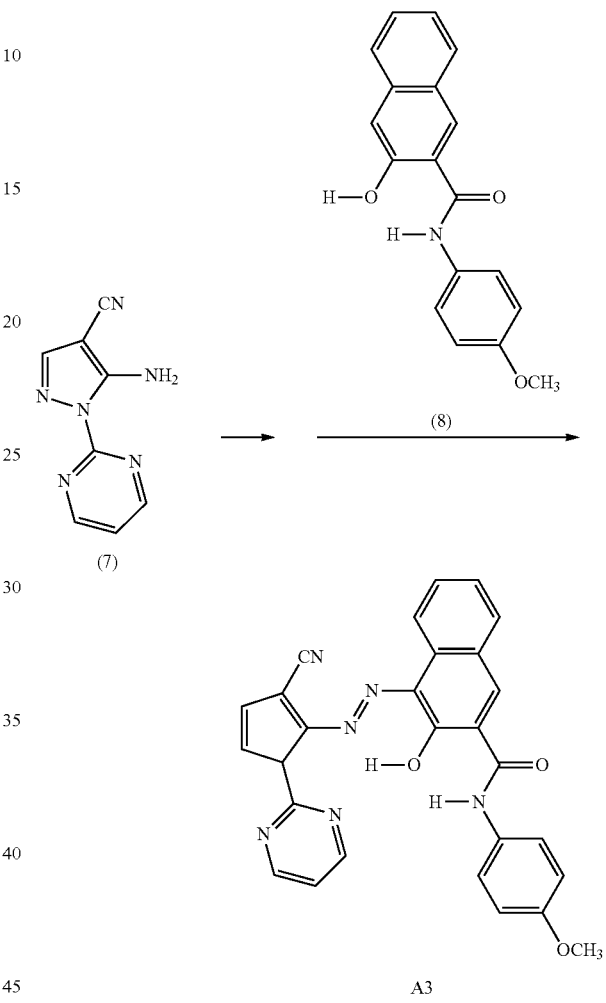

Specifically, 1.0 g of compound (7) is added to 10 ml of phosphoric acid (special grade reagent with 85% purity, available from Wako Pure Chemical Industries, Ltd.; hereinafter the same) and dissolved by heating at 30° C. The resulting solution is kept at 0° to 5° C. by ice cooling, and 0.38 g of sodium nitrite is added thereto, followed by stirring for 1.5 hours to form a diazonium salt solution. The diazonium salt solution is added dropwise to a solution of 1.4 g of compound (8) in 5 ml of dimethylacetamide maintained at 5° to 10° C. After the addition, the stirring is continued for another one hour while keeping the system at 5° to 10° C. The ice bath is removed, and the stirring is further continued for an additional period of 0.5 hours. To the reaction mixture is added 50 ml of water, and the mixture is completely dissolved by heating at 80° C. The precipitated crystals are collected by filtration, washed by pouring 50 ml of water, and dried. The crystals are stirred in 500 ml of dimethylacetamide at 80° C. for 3 hours and then at room temperature for 1 hour. The remaining crystals are collected by filtration, washed by pouring 500 ml of methanol, and dried to give 0.50 g of compound A3 in a yield of 21%.

Other azo compounds are synthesized in the same manner as described above.

Example 1

1 gram of compound A3, 0.1 mg of compound B3, 0.2 mg of compound C29, 0.2 g of sodium oleate, 2 g of glycerin, and 17 g of water are mixed and dispersed in a planetary ball mill together with 40 g of 0.1 mm diameter zirconia beads at 300 rpm for 8 hours. Separating the zirconium beads gave pigment dispersion 1.

Examples 2 to 7 and 9 to 19 and Comparative Examples 1 to 4

Pigment dispersions are prepared in the same manner as in Example 1, except for changing the amount or kind of the compounds as an azo pigment, a coloring agent (B), and an additive (C) as shown in Tables 1 and 2 below. In all Examples and Comparative Examples, the amount of the pigment is 1 g. In Table 1 and the following description, "PR254" stands for C.I. Pigment Red 254.

Example 8

The pigment composition of Example 8 is prepared as follows.

1.0 gram of compound (7) is dissolved in 10 ml of phosphoric acid (Special grade reagent (purity: 85%) from Wako Pure Chemical Industries, Ltd., hereinafter, the same reagent is used) by heating at 30° C. The resulting solution is kept at 0° to 5° C. by ice cooling, and 0.38 g of sodium nitrite is added thereto, followed by stirring for 1.5 hours to form a diazonium salt solution. The diazonium salt solution is added dropwise to a solution of 1.5 g of compound (8) in 5 ml of dimethylacetamide maintained at 5° to 10° C. After the addition, the stirring is continued for another one hour while keeping the system at 5° to 10° C. The ice bath is removed, and the stirring is further continued for an additional period of 0.5 hours. To the reaction mixture is added 50 ml of water, and the mixture is completely dissolved by heating at 80° C. The precipitated crystals are collected by filtration, washed by pouring 50 ml of water, and dried. To the crystals are added 100 ml of methanol, and the mixture is heated under reflux for 3 hours and then stirred at room temperature for 1 hour. The crystals precipitated are collected by filtration, washed by pouring 500 ml of methanol, and dried to give 0.80 g of a pigment mixture, which is analyzed by high performance liquid chromatography using LC-2010 from Shimadzu Corp. and is found to contain 0.7787 g of pigment A3, 0.0093 g of coloring agent B3, and 0.012 g of additive C29 in a total yield of 31%.

The resulting pigment mixture (1.27 g) is mixed with 0.2 g of sodium oleate, 2 g of glycerin, and 17 g of water and dispersed in a planetary ball mill together with 40 g of 0.1 mm diameter zirconia beads at 300 rpm for 8 hours. Separating the zirconium beads give pigment dispersion 8.

TABLE 1

| | Content relative to pigment A3 (%) | |
|---|---|---|
| | Coloring Agent B3 | Additive C29 |
| Example 1 | 0.01 | 0.02 |
| Example 2 | 4.5 | 0.2 |
| Example 3 | 0.3 | 4.6 |
| Example 4 | 2.5 | 2.0 |
| Example 5 | 9.2 | 0.5 |
| Example 6 | 0.2 | 9.1 |
| Example 7 | 4.5 | 5.2 |
| Example 8 | 1.5 | 1.2 |

TABLE 2

| | Pigment | Coloring Agent (Content relative to Pigment; %) | Additive (Content relative to Pigment; %) |
|---|---|---|---|
| Example 9 | A3 | B3 (2.5) | C1/C29 (1.2/2.5) |
| Example 10 | A1 | B1 (2.5) | C27 (2.5) |
| Example 11 | A3 | B3 (3.3) | — |
| Example 12 | A3 | — | C29 (3.3) |
| Example 13 | A20 | B2 (2.0) | C4/C52 (1.8/1.1) |
| Example 14 | A2 | B2 (2.5) | C28 (2.0) |
| Example 15 | A8 | B8 (2.5) | C34 (2.0) |
| Example 16 | A9 | B9 (2.5) | C35 (2.0) |
| Example 17 | A13 | B13 (2.5) | C39 (2.0) |
| Example 18 | A20 | B20 (2.5) | C46 (2.0) |
| Example 19 | A22 | B22 (2.5) | C48 (2.0) |
| Comparative Example 1 | PR254 | B3 (4.5) | C29 (5.2) |
| Comparative Example 2 | A1 | — | — |
| Comparative Example 3 | PR254 | B1 (2.7) | C1 (2.9) |
| Comparative Example 4 | PR254 | — | — |

Evaluation:

(1) Viscosity Stability with Time

The viscosity of each of the pigment dispersions prepared is measured with a corn-plate viscometer (RE-85L, from Toki Sangyo Co., Ltd.) at room temperature (25° C., hereinafter the same) immediately after preparation (viscosity η1; mPa·s) and after allowing to stand at room temperature for one week (viscosity η2; mPa·s) to calculate an increase in viscosity (η2−η1). The viscosity stability of the dispersion with time is rated based on the viscosity increase on an A to E scale as follows. The results of evaluation are shown in Table 3. The smaller the viscosity increase, the higher the viscosity stability with time.

Evaluation Criteria

A: A viscosity increase not more than 3 mPa·s.

B: A viscosity increase more than 3 mPa·s and not more than 4 mPa·s.

C: A viscosity increase more than 4 mPa·s and not more than 5 mPa·s.

D: A viscosity increase more than 5 mPa·s and not more than 6 mPa·s.

E: A viscosity increase more than 6 mPa·s.

(2) Light Fastness

Each of the pigment dispersions is applied to a matte photo paper (Photo Paper Matte (exclusive for pigment ink), from Seiko Epson) using a No. 3 bar coater to yield an optical density of 1.0 as measured with a reflective densitometer (X-Rite938, from X-Rite). The coated area of the photo paper is irradiated with xenon light (170000 lux) through a high pass filter (>325 nm) in a fade-o-meter for 14 days. The optical image density of the irradiated area is measured again with the reflective densitometer to calculate a pigment retention (density after irradiation/density before irradiation)×100 (%)), which is rated on an A to C scale as follows. The results obtained are shown in Table 3.

Evaluation Criteria
A: Pigment retention more than 80%.
B: Pigment retention more than 60% and not more than 80%.
C: Pigment retention less than 60%.
(3) Tinctorial Strength Each of the pigment dispersions is applied to a matte photo paper (Photo Paper Matte (exclusive for pigment ink), from Seiko Epson) using a No. 3 bar coater, and the optical density (OD) of the coated area is measured with a reflective densitometer (X-Rite938, from X-Rite). The tinctorial strength of the pigment dispersion is evaluated based on the measured OD and rated as follows. The results are shown in Table 3.
Evaluation Criteria
A: OD 1.6 or higher.
B: OD 1.5 or higher and less than 1.6.
C: OD 1.4 or higher and less than 1.5.
D: OD 1.2 or higher and less than 1.4.
E: OD less than 1.2.

TABLE 3

|  | Viscosity Stability with Time | Tinctorial Strength | Light Fastness |
|---|---|---|---|
| Example 1 | A | A | A |
| Example 2 | B | B | A |
| Example 3 | B | B | A |
| Example 4 | B | B | A |
| Example 5 | C | C | A |
| Example 6 | C | C | A |
| Example 7 | C | C | A |
| Example 8 | A | A | A |
| Example 9 | C | C | A |
| Example 10 | B | B | A |
| Example 11 | B | A | A |
| Example 12 | B | B | A |
| Example 13 | B | C | A |
| Example 14 | B | B | A |
| Example 15 | B | B | A |
| Example 16 | C | B | A |
| Example 17 | B | B | A |
| Example 18 | B | C | A |
| Example 19 | B | C | A |
| Comparative Example 1 | E | E | C |
| Comparative Example 2 | E | C | B |
| Comparative Example 3 | E | D | C |
| Comparative Example 4 | E | D | C |

The results in Table 3 demonstrate that the pigment compositions of Examples 1 to 19 are superior to those of Comparative Examples 1 to 4 in viscosity stability with time, light fastness, and tinctorial strength.

Example 20

Thirty parts of the pigment composition prepared in Example 8 (hereinafter referred to as pigment composition 8) and 95 parts of ion exchanged water are mixed and coarsely dispersed using a high speed disperser. The dispersion is further dispersed together with 600 parts of zirconia beads in a sand grinder mill for 4 hours, followed by separating the beads. To the resulting dispersion is slowly added 2 parts of polyethylene glycol diglycidyl ether (Denacol EX-821, from Nagase ChemteX Corp.) at 25° C., followed by stirring at 50° C. for 6 hours. The dispersion is filtered through an ultrafiltration membrane (300K molecular weight cutoff) to remove impurities and then passed through a 20 ml-syringe fitted with a filter having a pore size of 5 μm (acetyl cellulose membrane; outer diameter: 25 mm; from Fujifilm Corporation) to remove coarse particles to give pigment dispersion 20 having a solids concentration of 10% and a particle size of 80 nm measured with Nanotrac UPA-EX150, from Nikkiso Co., Ltd.).

Comparative Example 5

Comparative pigment dispersion 5 is prepared in the same manner as in Example 20, except for replacing pigment composition 8 with PR254 (BT-CF, from Ciba Special Chemicals, Ltd.).

Example 21

A mixture of 5% (on a solid basis) of pigment dispersion 20 prepared in Example 20, 10% of glycerin, 5% of 2-pyrrolidone, 2% of 1,2-hexanediol, 2% of triethylene glycol monobutyl ether, 0.5% of propylene glycol, and 75.5% of ion exchanged water is filtered using a 20 ml syringe fitted with a filter having a pore size of 1 μm (acetyl cellulose membrane; outer diameter: 25 mm; from Fujifilm Corporation) to remove coarse particles to give liquid pigment ink 21.

Comparative Example 6

Comparative liquid pigment ink 6 is prepared in the same manner as in Example 21, except for replacing pigment dispersion 20 with comparative pigment dispersion 5 of Comparative Example 5.
Evaluation:

Each of the inkjet inks obtained in Example 21 (liquid pigment ink 21) and Comparative Example 6 (comparative liquid pigment ink 6) is evaluated for ejection stability, printed image fastness (i.e., light fastness, heat fastness, and ozone fastness), image quality (freedom from metallic luster), and liquid ink stability as follows. The results of the evaluation are shown in Table 4.

A monochromatic image pattern with stepwise varying density and a blue/red/gray image pattern are printed on image-receiving sheets Photo Paper Glossy and Photo Paper High-Glossy "Crispia" (both from Seiko Epson Corp.) using an inkjet printer PX-V630 (from Seiko Epson) in which the Epson magenta ink cartridge is replaced with an ink cartridge filled with the ink to be tested. The printing is performed in the recommended mode "kirei". All the evaluations, except for metallic luster, are made on monochromatic printed images.
(1) Ejection Stability The set of ink cartridges is put in. After it is made sure that the ink is ejected from all the nozzles, 20 prints of A4 size are outputted. The prints are evaluated as follows.
A: No printing disturbance is observed from the beginning to the end of the printing.
B: One or more prints showed printing disturbance.
C: Printing disturbance occurred from the beginning to the end of the printing.
(2) Fastness of Image
(2-1) Light Fastness The image density (Ci) of a print is measured with X-rite 310 immediately after the printing. The print is irradiated with xenon light (100,000 lux) for 14 days using a weather-o-meter from Atlas, and the image density (CO is again measured to calculate an image retention (Cf/Cix100(%)). The image retention is determined on three points with reflective densities of 1, 1.5, and 2. A print is rated "A" when the image retention is 80% or more at all the three points; "B" when the image retention is less than 80% in one or two out of the three points; and "C" when the image retention is less than 80% in all the three points.
(2-2) Heat Fastness A print is stored at 80° C. and 60% RH for 7 days. The image density of the print is measured with X-rite 310 before and after the storage to calculate an image retention. The image retention is determined on three points with reflective densities of 1, 1.5, and 2. A print is rated "A" when the image retention is 95% or more at all the three points; "B" when the image retention is less than 95% in one or two out of the three points; and "C" when the image retention is less than 95% in all the three points.

(2-3) Ozone Fastness

A print is left to stand in a box containing ozone gas in a concentration of 5 ppm (25° C. and 50% RH) for 14 days. The ozone gas concentration in the box is controlled using an ozone gas monitor OZG-EM-01 from Applies. The image density of the print is measured with X-rite 310 before and after the standing to calculate an image retention. The image retention is determined on three points with reflective densities of 1, 1.5, and 2.0. A print is rated "A" when the image retention is 80% or more at all the three points; "B" when the image retention is less than 80% in one or two out of the three points; and "C" when the image retention is less than 80% in all the three points.

(3) Metallic Luster

The solid magenta, blue, and red printed areas are visually observed in reflected light. A print with no metallic luster is rated "good", and a print with metallic luster is rated "no good".

(4) Liquid Ink Stability

Each of pigment ink 21 and comparative pigment ink 6 is allowed to stand at 60° C. for 10 days. An ink showing no change in dispersed particle size is rated "good", while an ink showing a change in particle size is rated "no good".

TABLE 4

| Pigment Ink | Image Receiving Sheet | Ejection Stability | Light Fastness | Heat Fastness | Ozone Fastness | Freedom from Metallic Luster | Liquid Ink Stability | Pigment |
|---|---|---|---|---|---|---|---|---|
| Example 21 | glossy | A | A | A | A | good | good | pigment composition 8 |
| Example 21 | high glossy | A | A | A | A | good | good | pigment composition 8 |
| Comparative Example 6 | glossy | B | B | A | A | good | no good | PR254 |
| Comparative Example 6 | high glossy | B | B | A | A | good | no good | PR254 |

It is seen from Table 4 that the pigment ink prepared by using the pigment composition of the invention exhibits excellent ejection properties and weather resistance, reduces development of metallic luster, and has good dispersion stability. The system using the pigment ink prepared by using the pigment composition of the invention is thus proved excellent in all the performance properties tested and particularly superior to the comparative system in light fastness and dispersion stability of the ink.

Example 22

When the pigment ink of Example 21 is evaluated in the same manner as in Example 21, except for printing an image using inkjet glossy photo paper "GASAI" from Fujifilm as an image receiving sheet by PX-V630 (manufactured by Seiko Epson Corporation), similar results are obtained as described in Example 21.

As is apparent from the results in Table 4, the pigment ink containing the pigment composition of the invention exhibits high tinctorial strength and light fastness. Accordingly, the pigment composition of the invention is suited for use in printing inks for, for example, inkjet printing.

Example 23

Making of Color Filter by Photolithography

In a 70 ml mayonnaise bottle are put 0.6 g of pigment composition 8, 5.0 g of 1,2-propanediol 1-monomethyl ether 2-acetate (from Tokyo Chemical Industry) as a solvent, and 10 g of 0.3 mm diameter zirconia beads and shaken on a disperser DAS200 from LAU GmbH for 6 hours. The zirconia beads are removed to give pigment dispersion 23.

Comparative Example 7

A comparative pigment dispersion is prepared in the same manner as in Example 23, except for replacing the pigment used in Example 23 (pigment composition 8) with PR254.

The pigment dispersions prepared in Example 23 and Comparative Example 7 are evaluated as follows. The results obtained are shown in Table 5.

(1) Dispersibility of Pigment

The volume average particle size of the dispersions is determined using a dynamic scattering particle size analyzer (Microtrac UPA150, from Nikkiso) in a usual manner. A dispersion is rated A when the volume average particle size is less than 50 nm; B when the volume average particle size is 50 nm to less than 100 nm; C when the volume average particle size is 100 nm to less than 200 nm; or D when the volume average particle size is 200 nm or greater.

(2) Dispersion Stability

The volume average particle size of each dispersion is determined using a dynamic scattering particle size analyzer (Microtrac UPA150, from Nikkoso) in a usual manner after 2 hours from the preparation and after the dispersion is stored at 70° C. for 2 days. A dispersion is rated A when both measured values are less than 150 nm; B when one or both measured values are from 150 nm to less than 200 nm; or C when one or both measured values are 200 nm or greater.

(3) Light Fastness

Light fastness of the pigment dispersions is evaluated in the same manner as described above. The calculated pigment retention (%) is rated A when it is 90% or higher; B when it is from 80% to less than 90%; or C when it is less than 80%.

TABLE 5

| | Pigment | Dispersibility of Pigment | Dispersion Stability | Light Fastness |
|---|---|---|---|---|
| Example 23 | pigment composition 8 | B | B | A |
| Comparative Example 7 | PR254 | B | B | C |

Pigment dispersion 23 prepared above is mixed with the other components shown in the following formulation, and the mixture is shaken in a disperser DAS200 for 30 minutes to prepare coloring composition 23 for making a color filter by photolithography. Formulation of coloring composition 23:

| | |
|---|---|
| Pigment dispersion 23 | 15.6 g |
| Photo-sensitive resin (Cyclomer P200, from Daicel Chemical Industries, Ltd.) | 2.5 g |
| Pentaerythritol tetraacrylate (from Aldrich) | 0.2 g |
| 2-Benzyl-2-dimethylamino-4'-morpholinobutyrophenone (from Aldrich) | 0.05 g |
| 2,4-Diethyl-9H-thioxanthen-9-one (from Tokyo Chemical Industry) | 0.05 g |
| 1,2-Propanediol 1-monomethyl ether 2-acetate (from Tokyo Chemical Industry) | 0.8 g |
| Cyclohexanone (from Tokyo Chemical Industry) | 0.2 g |

Coloring composition 23 thus prepared is applied to a slide glass with a bar coater (rod No. 10) and dried in an oven at 80° C. for 5 minutes to form an ink coating film. The ink coating film is exposed to light from a high pressure mercury lamp at 200 mJ/cm$^2$ with a part of its surface masked. The exposed film is developed with a 0.5% sodium carbonate aqueous solution at 25° C. and then baked in an oven at 220° C. for 20 minutes to make a color filter. The transmittance of the color filter is measured using a spectrophotometer (U-3310, from Hitachi, Ltd.). The transmittance at 650 nm and 540 nm and the minimum transmission wavelength (λmin) between 540 nm and 610 nm are obtained. The results obtained are shown in Table 7.

Example 24

A pigment dispersion is prepared in the same manner as for pigment dispersion 23, except for additionally using 0.5 g of a surfactant (a wetting and dispersing additive BYK-161, from BYK-Chemie) per 0.6 g of the pigment composition 8 (dispersing time: 6 hours). A color filter is made in the same manner as in Example 23, except for using the resulting pigment dispersion. The resulting color filter exhibited the similar transmission characteristics as obtained in Example 23.

Examples 25 to 30

A pigment dispersion is prepared in the same manner as for pigment dispersion 23, except for additionally using each of the dispersants shown below in the amount shown per 0.6 g of the pigment composition 8 (dispersing time: 6 hours). A color filter is made in the same manner as in Example 23, except for using the resulting pigment dispersion. The resulting color filter exhibited the similar transmission characteristics as obtained in Example 23.

| | |
|---|---|
| Example 25: Pigment type additive (Solspersse 22000, from Zenaca Co., Ltd.) | 0.012 g |
| Example 26: Silicone type additive (Paintad 32, from Dow Corning Asia) | 0.006 g |
| Example 27: Silicone type additive (Paintad 57, from Dow Corning Asia) | 0.012 g |
| Example 28: Silicone type additive (DK Q8-8011, from Dow Corning Asia) | 0.012 g |
| Example 29: Surfactant (Disparlon DA-325, from Kusumoto Chemicals) | 0.200 g |
| Example 30: Surfactant (Disparlon DA-1860, from Kusumoto Chemicals) | 0.120 g |

Comparative Example 7

A color filter is made in the same manner as in Example 23, except for replacing pigment composition 8 with PR254 (IRGAPHORE DPP RED, from Ciba Specialty Chemicals). The transmission characteristics of the resulting color filter are determined in the same manner as in Example 23. The results obtained are shown in Table 7.

TABLE 7

| | | | Transmission | |
|---|---|---|---|---|
| | Pigment | λmin | 650 nm | 540 nm |
| Example 23 | pigment composition 8 | 571 nm | 93% | 2% |
| Comparative Example 7 | PR254 | 564 nm | 80% | 8% |

The transmission curve of the color filter obtained by using the dedicated coloring composition of the invention containing pigment composition 8 rises sharply and exhibits high transmittances in the region of 650 to 750 nm, indicating excellent transmission characteristics. The color filter of the invention containing pigment composition 8 is also excellent in that it has low transmission at 540 nm, whereas the color filter of Comparative Example 7 shows another transmission peak at 540 nm.

Furthermore, the color filter obtained by using the dedicated coloring composition of the invention has a far lower transmittance for blue light (350 to 400 nm) than the comparative color filter obtained in Comparative Example 7, allowing for red display with high color purity.

It is possible with the coloring composition for color filter of the invention to appropriately adjust the wavelength at which the transmittance of a color filter abruptly changes between about 540 nm and about 590 nm by selecting the structure of the azo pigment (A) of formula (1). That is, the coloring composition of the invention is beneficial in that it provides an optimal red hue in accordance with the backlight wavelength of a display device.

Evaluation:
(1) Heat Resistance of Color Filter

Each of the color filters obtained in Example 23 and Comparative Example 7 is exposed to a temperature of 250° C. for 90 minutes in the atmosphere. The color difference caused by the exposure is determined using a spectrophotometer (Macbeth Color Eye-3000, from Sakata Inx Corp.). The heat resistance of the color filter is rated as follows based on the color difference (ΔE*ab). The results are shown in Table 8.
A: ΔE*ab<1.0
B: 1.0≦ΔE<1.1
C: 1.1≦ΔE*ab

TABLE 8

| | Pigment | Heat Resistance ΔE*ab |
|---|---|---|
| Example 23 | pigment composition 8 | A |
| Comparative Example 7 | PR254 | C |

The color filter of Example 23, which is made from the dedicated coloring composition of the invention containing pigment composition 8, proved superior in heat resistance to the comparative color filter using pigment of Comparative Example 7.

(2) Light Fastness of Coloring Composition for Color Filter

Each of the coloring compositions used in Example 23 and Comparative Example 7 is applied to Photo Paper Matte (exclusive for pigment ink), from Seiko Epson, using a No. 3 bar coater to yield an optical density of 1.0 as measured with a reflective densitometer (X-Rite938, from X-Rite). The coated area of the photo paper is irradiated with xenon light (170000 lux) through a high pass filter (>325 nm) in a fade-o-meter for 14 days. The optical image density of the irradiated area is measured again with the reflective densitometer to calculate a pigment retention (density after irradiation/density before irradiation)×100(%)), which is rated on an A to C scale as follows. The results obtained are shown in Table 8.

A: Pigment retention more than 80%.
B: Pigment retention more than 60% and not more than 80%.
C: Pigment retention less than 60%.

TABLE 9

| | Pigment | Light Fastness |
|---|---|---|
| Example 23 | pigment composition 8 | A |
| Comparative Example 7 | PR254 | C |

The color filter of Example 23, which is made from the dedicated coloring composition of the invention containing pigment composition 8, proved superior in light fastness to the comparative color filter.

(3) Contrast Ratio of Color Filter

The contrast ratio of the color filters obtained above is determined using a contrast tester CT-1 from Tsubosaka Electric Co., Ltd. A contrast ratio ≧23000 is rated "A", 23000>contrast ratio≧18000 is rated "B", and 18000>contrast ratio is rated "C". The results are shown in Table 10.

TABLE 10

| | Pigment | Contrast Ratio |
|---|---|---|
| Example 23 | pigment composition 8 | A |
| Comparative Example 7 | PR254 | C |

The color filter of Example 23, which is made from the coloring composition of the invention containing pigment composition 8, proved superior in contrast characteristics to the comparative color filter.

(4) Storage Stability of Coloring Composition

Coloring composition 23 prepared in Example 23 and the comparative coloring composition of Comparative Example 7 are stored in a dark room at room temperature for 2 weeks. After the storage, the composition is visually inspected for particle settling to evaluate the storage stability of the composition on an A to C scale: A=no settling; B=slight settling; and C=setting. The results obtained are shown in Table 10.

TABLE 11

| | Coloring Composition | Pigment | Storage Stability |
|---|---|---|---|
| Example 23 | coloring composition 23 | pigment composition 8 | A |
| Comparative Example 7 | comparative coloring composition | PR254 | B |

Coloring composition 23 for color filter, which is prepared using pigment dispersion 23 containing pigment composition 8, is free from settling of particles with time, proving excellent in dispersion storage stability as compared with the comparative coloring composition.

Example 31

<Preparation of Green Pigment Dispersion>
-Preparation of Green Pigment Dispersion P1-

A mixture composed of 12.6 parts of a 100/55 (by weight) pigment mixture of C.I. Pigment Green 36 and C.I. Pigment Yellow 139, 5.2 parts of a dispersant of BYK2001 (Disperbyk; manufactured by Byk-Chemie GmbH; solid content: 45.1% by weight), 2.7 parts of a dispersing resin of benzyl methacrylate/methacrylic acid copolymer (acid value: 134 mgKOH/g; Mw=30,000), and 78.3 parts of a solvent of propylene glycol monomethyl ether acetate is mixed and dispersed in a beads mill for 15 hours to obtain a green pigment dispersion P1.

<Preparation of Red Pigment Dispersion>
-Preparation of Red Pigment Dispersion P2-

A mixture composed of 12.1 parts of a 100/45 (by weight) pigment mixture of D-1 and C.I. Pigment Yellow 139, 10.4 parts of a dispersant of BYK2001 (Disperbyk; manufactured by Byk-Chemie GmbH; solid content: 45.1% by weight), 3.8 parts of a dispersing resin of benzyl methacrylate/methacrylic acid copolymer (acid value: 134 mgKOH/g; Mw=30,000), and 73.7 parts of a solvent of propylene glycol monomethyl ether acetate is mixed and dispersed in a beads mill for 15 hours to obtain a red pigment dispersion P2.

<Preparation of Blue Pigment Dispersion>
-Preparation of Blue Pigment Dispersion P3-

A mixture composed of 14 parts of a 100/25 (by weight) pigment mixture of C.I. Pigment Blue 15:6 and C.I. Pigment Violet 23, 4.7 parts of a dispersant of BYK2001 (Disperbyk; manufactured by Byk-Chemie GmbH; solid content: 45.1% by weight), 3.5 parts of a dispersing resin of benzyl methacrylate/methacrylic acid copolymer (acid value: 134 mgKOH/g; Mw=30,000), and 77.8 parts of a solvent of propylene glycol monomethyl ether acetate is mixed and dispersed in a beads mill for 15 hours to obtain a blue pigment dispersion P3.

<Preparation of Green-colored Photo-Sensitive Composition (Coating Solution) A-1>

The above-described green pigment dispersion P1 is used, and components of the following formulation are mixed and stirred to prepare a colored photo-sensitive composition A-1.

TABLE 12

| <Formulation> | |
|---|---|
| Aforesaid Green pigment dispersion P1 | 83.3 parts |
| Alkali-soluble resin: P-1 | 2.05 parts |
| OXE-01 (photopolymerization initiator; manufactured by CIBA Specialty Chemicals) | 1.2 parts |
| Monomer 1: KARAYAD DPHA (manufactured by Nippon Kayaku Co., Ltd.) | 1.4 parts |
| Monomer 2: M-305 (manufactured by Toagosei Co., Ltd.) | 1.4 parts |

TABLE 12-continued

| <Formulation> | |
| --- | --- |
| p-methoxyphenol | 0.001 part |
| Polyethylene glycol methyl ether acetate [PGMEA (hereinafter, the same abbreviation will be used); solvent] | 7.4 parts |
| Surfactant (trade name: F-781; 0.2% solution of PGMEA; manufactured by DIC Corporation) | 4.2 parts |

<Preparation of Red-colored Photo-sensitive Composition (Coating Solution) B-1>

The above-described red pigment dispersion P2 is used, and components of the following formulation are mixed and stirred to prepare a colored photo-sensitive composition B-1.

TABLE 13

| <Formulation> | |
| --- | --- |
| Aforesaid Red pigment dispersion P2 | 59.6 parts |
| Alkali-soluble resin: P-1 | 1.2 parts |
| OXE-02 (photopolymerization initiator; manufactured by CIBA Specialty Chemicals) | 0.7 part |
| Monomer 1: KARAYAD DPHA (manufactured by Nippon Kayaku Co., Ltd.) | 1.6 parts |
| Monomer 2: SR-494 (manufactured by Sartomer Company, Inc..) | 1.6 parts |
| p-methoxyphenol | 0.002 part |
| Polyethylene glycol methyl ether acetate [PGMEA (hereinafter, the same abbreviation will be used); solvent] | 31 parts |
| Surfactant (trade name: F-781; 0.2% solution of PGMEA; manufactured by DIC Corporation) | 4.2 parts |

<Preparation of Blue-colored Photo-sensitive Composition (Coating Solution) C-1>

The above-described blue pigment dispersion P3 is used, and components of the following formulation are mixed and stirred to prepare a colored photo-sensitive composition C-1.

TABLE 14

| <Formulation> | |
| --- | --- |
| Aforesaid Blue pigment dispersion P3 | 50.6 parts |
| Alkali-soluble resin: P-1 | 2.1 parts |
| OXE-01 (photopolymerization initiator; manufactured by CIBA Specialty Chemicals) | 1.2 parts |
| Monomer 1: KARAYAD DPHA (manufactured by Nippon Kayaku Co., Ltd.) | 1.2 parts |
| Monomer 2: SR-494 (manufactured by Sartomer Company, Inc..) | 3.5 parts |
| p-methoxyphenol | 0.002 part |
| Polyethylene glycol methyl ether acetate [PGMEA (hereinafter, the same abbreviation will be used); solvent] | 36 parts |
| Surfactant (trade name: F-781; 0.2% solution of PGMEA; manufactured by DIC Corporation) | 4.2 parts |

The green-colored photo-sensitive composition A-1 having been prepared hereinbefore is coated on a silicon wafer on which 8-inch device has been formed and previously sprayed with hexamethyldisilazane, thus a photo-curable coated film being formed. Then, this coated film is subjected to heating treatment (prebake) for 180 seconds using a 100° C. hot plate so that the dry thickness of the coated film becomes 1.0 μn. Subsequently, the film is irradiated through a 1.0-μm square Bayer pattern mask at a wavelength of 365 nm using an i-line stepper exposure apparatus FPA-3000i5+ (manufactured by Canon Inc.) in an irradiation amount of from 50 to 1,000 mJ/cm² (exposure amount being changed stepwise by 50 mJ/cm²). Thereafter, the silicon wafer on which the irradiated coated film is formed is placed on a horizontal rotary table of a spin shower developing machine (model DW-30; manufactured by Chemitronics Co., Ltd.), and paddle development is conducted at 23° C. for 180 seconds using a 40% diluting solution of CD-2000 (manufactured by Fujifilm Electronics Materials) to form a colored pattern on the silicon wafer.

The silicon wafer on which the colored pattern is formed is fixed on the aforesaid horizontal rotary table by vacuum-chucking system and, while rotating the silicon wafer at a rotation number of 50 rpm by means of a rotating apparatus, pure water is supplied from above the rotation center through a jet nozzle in a shower state to conduct rinsing treatment, followed by spray drying.

Next, the silicon wafer is heated for 5 minutes on a 200° C. hot plate to obtain a color film on which a pattern is formed.

Further, the same procedures as with Green except for using the above-described Red-colored photo-sensitive composition B-1 and Blue-colored photo-sensitive composition C-1 and exposing through a 1.0-μm square island pattern mask are conducted to thereby form a color filter formed by RGB patterns.

Good spectral characteristics can be confirmed by preparing a camera module using a device wherein this color filter is formed.

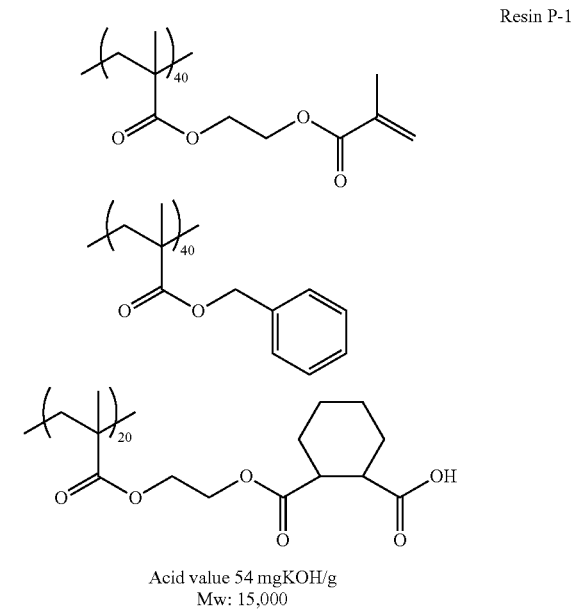

Resin P-1

Acid value 54 mgKOH/g
Mw: 15,000

While the present invention has been shown and described with reference to certain exemplary embodiments thereof, it will be understood by those skilled in the art that various changes modifications may be made therein without departing from the spirit and scope of the present invention as defined by the appended claims.

What is claimed is:

1. A pigment composition comprising:
(A) an azo pigment represented by formula (1):

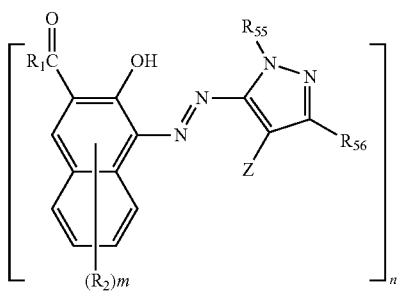

Formula (1)

wherein
- $R_1$ represents an amino group, an aliphatic oxy group, an aliphatic group, an aryl group, or a heterocyclic group;
- $R_2$ represents a substituent;
- $R_{55}$ represents a substituent;
- $R_{56}$ represents a hydrogen atom or a substituent;
- Z represents an electron-withdrawing group having a Hammett constant σp of 0.2 or greater; m represents an integer of 0 to 5;
- n represents an integer of 1 to 4;
- when n is 2 to 4, the compound is a dimer, trimer, or tetramer formed via $R_1$, $R_2$, $R_{55}$, $R_{56}$, or Z; and
- formula (1) has no ionic hydrophilic group, and at least one of (B) a coloring agent represented by formula (2), or (C) at least one additive represented by formula (3) or an additive represented by formula (4):

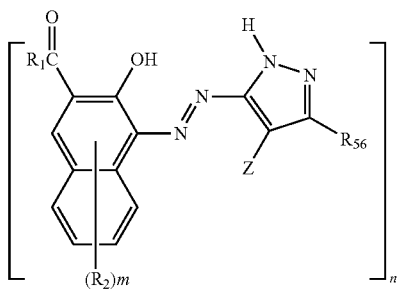

Formula (2)

wherein
$R_1$, $R_2$, $R_{56}$, Z, m, and n are as defined above:

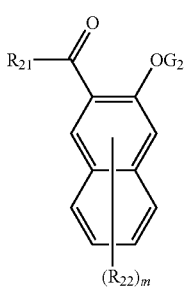

Formula (3)

wherein
- $G_2$ represents a hydrogen atom, an aliphatic group, an aryl group, or a heterocyclic group;
- $R_{21}$ represents an amino group, an aliphatic oxy group, an aliphatic group, an aryl group, or a heterocyclic group;
- $R_{22}$ represents a substituent;
- m is as defined above; and
- formula (3) has no ionic hydrophilic group:

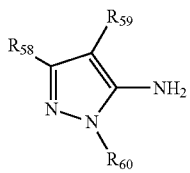

Formula (4)

wherein
- $R_{60}$ represents a hydrogen atom or a substituent;
- $R_{58}$ and $R_{59}$ each independently represent a hydrogen atom or a substituent; and
- $R_{58}$ and $R_{59}$ may be taken together to form a 5- or 6-membered ring.

2. The pigment composition according to claim 1, comprising:
the azo pigment (A);
the coloring agent (B); and
the at least one additive represented by formula (3) or the additive represented by formula (4).

3. The pigment composition according to claim 1, wherein the total amount of the at least one of the coloring agent (B) and the at least one of the additive represented by formula (3) and the additive represented by formula (4), relative to the amount of the azo pigment (A), is 0.001% to 10% by mass.

4. The pigment composition according to claim 1, wherein the total amount of the at least one of the coloring agent (B) and the at least one of the additive represented by formula (3) and the additive represented by formula (4), relative to the amount of the azo pigment (A), is 0.001% to 5% by mass.

5. The pigment composition according to claim 1, wherein the total amount of the at least one of the coloring agent (B) and the at least one of the additive represented by formula (3) and the additive represented by formula (4), relative to the amount of the azo pigment (A), is 0.001% to 3% by mass.

6. An ink for inkjet recording comprising the pigment composition according to claim 1.

7. A coloring composition for color filter comprising the pigment composition according to claim 1.

8. A color filter comprising the coloring composition for color filter according to claim 7.

* * * * *